(12) United States Patent
Shimizu et al.

(10) Patent No.: US 12,244,353 B2
(45) Date of Patent: Mar. 4, 2025

(54) OPTICAL MODULE SWITCH DEVICE

(71) Applicant: Fujitsu Limited, Kawasaki (JP)

(72) Inventors: Kozo Shimizu, Atsugi (JP); Hisakatsu Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 151 days.

(21) Appl. No.: 18/165,676

(22) Filed: Feb. 7, 2023

(65) Prior Publication Data
US 2023/0353253 A1  Nov. 2, 2023

(30) Foreign Application Priority Data

May 2, 2022  (JP) .................................. 2022-075762

(51) Int. Cl.
*H04B 10/80* (2013.01)
*H04B 10/50* (2013.01)

(52) U.S. Cl.
CPC ....... *H04B 10/801* (2013.01); *H04B 10/5051* (2013.01); *H04B 10/5053* (2013.01)

(58) Field of Classification Search
CPC ............. H04B 10/801; H04B 10/5051; H04B 10/5053; H04Q 2011/0045; H04Q 11/0005; H04Q 2213/1336; H04L 7/0037; H04L 49/357; H04L 12/433; H04L 45/60; H04L 45/00; H04J 3/0685; H04J 3/0647; H04J 3/06; H04J 3/062; H04J 3/1611; H04J 14/0267
See application file for complete search history.

(56) References Cited

U.S. PATENT DOCUMENTS

| 5,808,571 A | * | 9/1998 | Kuwata | ................. | H04J 3/0685 |
| | | | | | 341/100 |
| 10,536,165 B1 | * | 1/2020 | Gaurav | .................... | H04J 1/085 |
| 2007/0264015 A1 | * | 11/2007 | Li | ......................... | H04J 3/1611 |
| | | | | | 398/45 |

(Continued)

FOREIGN PATENT DOCUMENTS

JP  2013-030987 A  2/2013

*Primary Examiner* — Hibret A Woldekidan
(74) *Attorney, Agent, or Firm* — ArentFox Schiff LLP

(57) ABSTRACT

An optical module switch device includes a first serial-parallel-converter coupled to first signal-lines coupled to optical modules, and second signal-lines, a number of the second signal-lines being greater than the first signal-lines thereof, and configured to transmit/receive first signals at a first transmission-rate to/from the optical modules by using the first signal-lines, respectively, a second serial-parallel-converter coupled to second signal-lines coupled to the first serial-parallel-converter, and third signal-lines, a number of the third lines being greater than the second signal-lines thereof, and configured to transmit/receive second signals at a second transmission-rate lower than the first transmission-rate to/from the first serial-parallel-converter by using the second signal-lines, respectively, and a switch circuit coupled to the third signal-lines, and configured to transmit/receive third signals at a third transmission-rate lower than the second transmission-rate to/from the second serial-parallel-converter by using the third signal-lines, respectively, to perform routing processing based on the received third signals.

10 Claims, 16 Drawing Sheets

(56) References Cited

U.S. PATENT DOCUMENTS

| | | |
|---|---|---|
| 2013/0028599 A1 | 1/2013 | Sone et al. |
| 2019/0238235 A1* | 8/2019 | Houtsma ................ H04B 10/64 |
| 2019/0306018 A1* | 10/2019 | Steverson ........... H04L 41/0806 |
| 2019/0319709 A1* | 10/2019 | Zheng .................... H04B 10/40 |
| 2021/0083778 A1* | 3/2021 | Honda ................. H04B 10/572 |

* cited by examiner

OPTICAL MODULE SWITCH DEVICE

CROSS-REFERENCE TO RELATED APPLICATION

This application is based upon and claims the benefit of priority of the prior Japanese Patent Application No. 2022-75762, filed on May 2, 2022, the entire contents of which are incorporated herein by reference.

FIELD

The embodiments discussed herein are related to an optical module switch device.

BACKGROUND

There is known a repeater that improves transmission efficiency by converting an optical signal received from a side of an optical network unit at a first transmission rate into an optical signal of a second transmission rate higher than the first transmission rate, and outputting the optical signal obtained by the conversion to a side of an optical line terminal. For example, the optical line terminal converts the received optical signal into an electric signal by an optical receiver and converts the electric signal obtained by the conversion into a parallel electric signal by a serializer/deserializer to reduce the transmission rate of the electric signal, and then performs signal reception processing.

Japanese Laid-open Patent Publication No. 2013-30987 is disclosed as related art.

SUMMARY

According to an aspect of the embodiments, an optical module switch device includes a first serial-parallel converter coupled to first signal lines coupled to optical modules, and second signal lines, a number of the second signal lines being greater than a number of the first signal lines, and configured to transmit and receive first signals at a first transmission rate to and from the optical modules by using the first signal lines, respectively, a second serial-parallel converter coupled to second signal lines coupled to the first serial-parallel converter, and third signal lines, a number of the third lines being greater than a number of the second signal lines, and configured to transmit and receive second signals at a second transmission rate lower than the first transmission rate to and from the first serial-parallel converter by using the second signal lines, respectively, and a switch circuit coupled to the third signal lines, and configured to transmit and receive third signals at a third transmission rate lower than the second transmission rate to and from the second serial-parallel converter by using the third signal lines, respectively, to perform routing processing based on the received third signals.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

There is known an optical module switch device that receives an optical signal by an optical module, performs routing processing of data included in the received optical signal by a switch circuit, and transmits the data from another optical module to a destination as an optical signal. As a speed of the optical module switch device increases (bandwidth increases), a speed of the optical modules mounted on the optical module switch device increases, the number of optical modules mounted increases, and power consumption of the optical module switch device tends to increase.

The switch circuit that performs the routing processing and the optical modules are coupled by electric signal lines. As the speed of the optical modules increases, a transmission rate of electric signals transmitted to these electric signal lines also increases. Furthermore, as the number of optical modules mounted increases, a wire length of the electric signal lines also increases due to restrictions on arrangement of the optical modules. As a result, there is a possibility that signal distortion of the electric signals transmitted between the switch circuit and the optical modules may become significant.

In order to receive a fast electric signal and correctly determine a logical value (1 or 0) of data included in the electric signal, a circuit that corrects the signal distortion is needed, and power consumption thereof increases as the speed of the optical modules increases and the number of optical modules mounted increases. At the same time, when a retimer function that suppresses deterioration of a waveform in a time direction is turned on, power consumption further increases.

Hereinafter, embodiments of techniques capable to reduce power consumption of an optical module switch device will be described with reference to the drawings.

Figure 1:
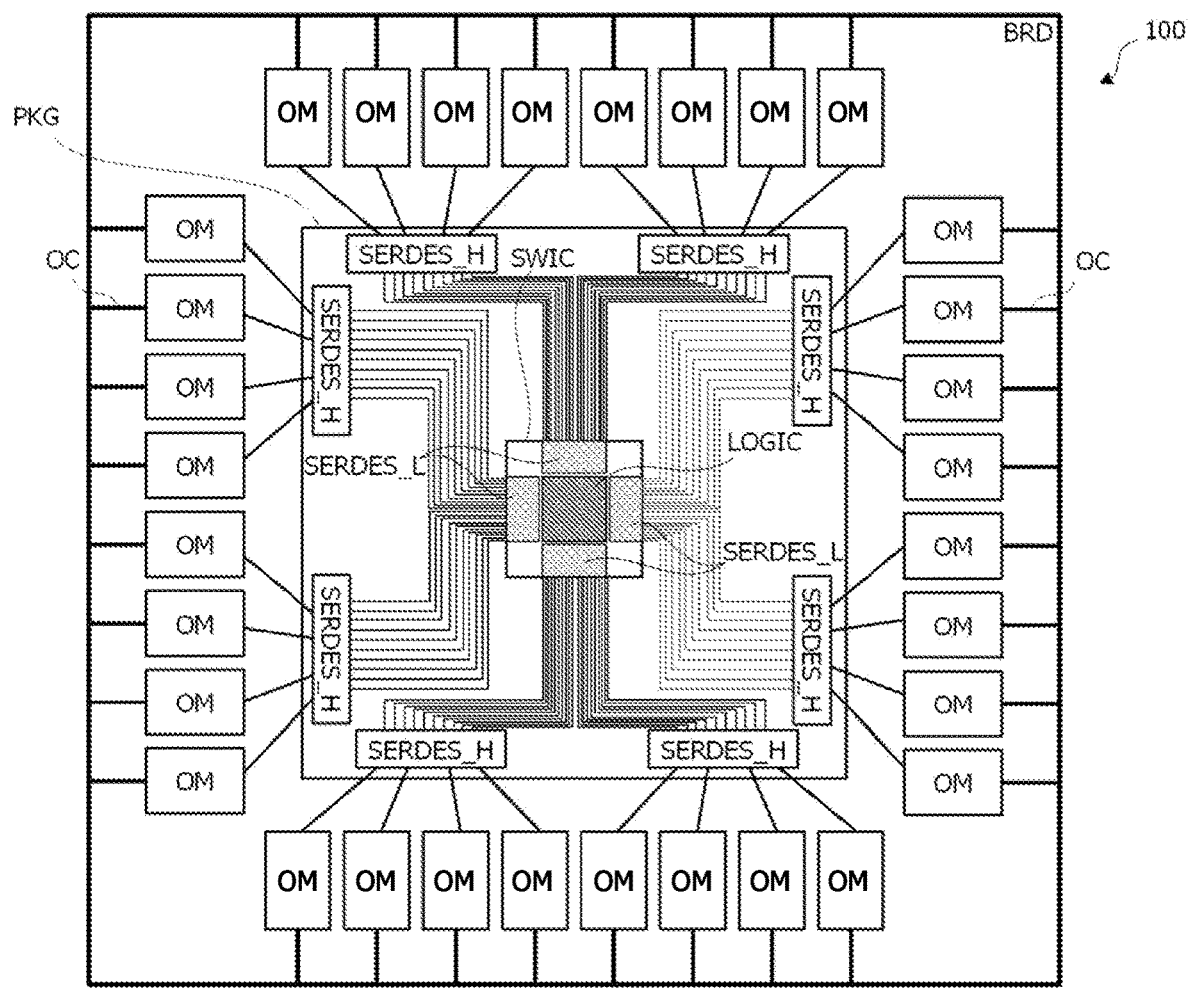
FIG. 1 is a plan view illustrating an example of an optical module switch device of an embodiment.

FIG. 1 illustrates an example of an optical module switch device of an embodiment. An optical module switch device 100 illustrated in FIG. 1 includes a circuit board BRD such as a printed circuit board on which a plurality of optical modules OM and a package PKG are mounted. Although not particularly limited, for example, 16 optical modules OM (eight on a front surface and eight on a back surface) are mounted along each side of the rectangular circuit board BRD. Furthermore, the optical modules OM are arranged on the circuit board BRD and outside an outer periphery of the package PKG (at positions adjacent to the outer periphery). Each optical module OM is coupled to an optical cable OC through which an optical signal to be transmitted and received is transmitted. Note that, in FIG. 1, signal lines other than the optical cables OC are electric signal lines.

The package PKG includes an organic circuit board, and a plurality of serializers/deserializers SERDES_H and a semiconductor chip SWIC that are mounted on the organic circuit board. The serializers/deserializers SERDES_H are arranged on the package PKG and inside the outer periphery of the package PKG (at positions adjacent to the outer periphery). The semiconductor chip SWIC is mounted in a central portion of the package PKG.

For example, the optical module switch device 100 has a form of near package optics (NPO) in which the optical modules OM are arranged at positions close to the package PKG. Each optical module OM and each serializer/deserializer SERDES_H are arranged at the positions adjacent to the outer periphery of the package PKG, and the semiconductor chip SWIC is mounted in the central portion of the package PKG. Thus, a length of the signal line coupling the optical module OM and the serializer/deserializer SERDES_H may be made shorter than a length of the signal line coupling the serializer/deserializer SERDES_H and the semiconductor chip SWIC.

Although not particularly limited, for example, 128 serializer/deserializers SERDES_H are mounted along each side of the rectangular package PKG. For example, one serializer/deserializer SERDES_H group indicated by a rectangle in FIG. 1 includes 64 serializers/deserializers SERDES_H. 32 of the 64 serializers/deserializers SERDES_H are coupled to four optical modules OM on the front surface of the circuit board BRD. Furthermore, remaining 32 serializers/deserializers SERDES_H are coupled to four optical modules OM on the back surface of the circuit board BRD. For example, each optical module OM is coupled to eight serializers/deserializers SERDES_H.

Note that the optical modules OM on the back surface of the circuit board BRD and the serializers/deserializers SERDES_H are coupled via wires formed on the circuit board BRD, bumps coupling the circuit board BRD and the package PKG, and wires formed on the package PKG. The optical modules OM and the circuit board BRD may be coupled via bumps. The serializers/deserializers SERDES_H and the package PKG may be coupled via bumps.

The semiconductor chip SWIC includes a plurality of serializers/deserializers SERDES_L and a logic unit LOGIC that performs routing processing. In the following, the serializers/deserializers SERDES_H are also simply referred to as SERDES_Hs and the serializers/deserializers SERDES_L are also simply referred to as SERDES_Ls. The SERDES_H is an example of a first serial-parallel converter, and the SERDES_L is an example of a second serial-parallel converter.

The logic unit LOGIC is arranged in a central portion of the semiconductor chip SWIC. By mounting the semiconductor chip SWIC in the central portion of the package PKG, it is possible to suppress variations in the length of the signal lines in the package PKG, which couple the SERDES_Hs and the SERDES_Ls to each other. With this configuration, it is possible to suppress variations in an amount of delay of signals transmitted between each optical module OM and the semiconductor chip SWIC.

In FIG. 1, one SERDES_L arranged along each side of the rectangular semiconductor chip SWIC corresponds to 128 SERDES_Ls. Thus, one SERDES_L is coupled to one SERDES_H. 4-bit signals are transmitted in parallel and 4-bit signals are received in parallel between each SERDES_L and each SERDES_H.

Here, each bit signal transmitted in the package PKG is a differential signal, and is transmitted or received using a pair of signal lines and one shield line. Thus, 24 wires are used for transmitting the 4-bit signals and receiving the 4-bit signals between each SERDES_L and each SERDES_H. Therefore, the 128 SERDES_Hs arranged on each side of the package PKG and the 128 SERDES_Ls arranged on each side of the semiconductor chip SWIC are coupled by 3072 (128×24) wires.

Although not particularly limited, it is assumed that a length of each side of the package PKG is 85 mm and a wiring area (line/space) used for one wire in the package PKG is 0.002 mm. Here, the line indicates a wire width, and the space indicates the minimum distance between adjacent wires. In this case, a width of the wiring area needed for the 3072 wires is 6.144 mm, and wiring may be performed with a margin in the package PKG. Furthermore, it is possible to form 3072 terminals per side of the semiconductor chip SWIC.

32-bit signals are transmitted in parallel and 32-bit signals are received in parallel between each SERDES_L and the logic unit LOGIC. Since a speed of these signals is low compared to a speed of signals transmitted between the SERDES_H and the SERDES_L and each SERDES_L and the logic unit LOGIC are mounted on the same chip, a wire length of the 32-bit signal lines is also short, and an influence of external noise is also small. Thus, signals transmitted between each SERDES_L and the logic unit LOGIC are transmitted as single-ended signals without using the shield line. Therefore, there are 64 wires for signals, which are coupled between one SERDES_L and the logic unit LOGIC. The 64 wires include 32 signal lines for transmission and 32 signal lines for reception.

A transmission rate of an optical signal that each optical module OM transmits to or receives from the optical cable OC is, for example, 800 Gb/s. A transmission rate of a 1-bit signal that one SERDES_H transmits to or receives from the optical module OM is, for example, 100 Gb/s. Thus, a transmission rate of signals transmitted between eight SERDES_Hs and one optical module OM is 800 Gb/s.

A transmission rate of each 4-bit signal that one SERDES_L transmits to or receives from one SERDES_H is, for example, 25 Gb/s. Thus, a transmission rate of signals transmitted between one SERDES_L and one SERDES_H is 100 Gb/s.

A transmission rate of each 32-bit signal that one SERDES_L transmits to or receives from the semiconductor chip SWIC is, for example, 3.125 Gb/s corresponding to an operation frequency of a logic chip. Thus, a transmission rate of signals transmitted between one SERDES_L and the semiconductor chip SWIC is 100 Gb/s. 100 Gb/s is an example of a first transmission rate. 25 Gb/s is an example of a second transmission rate. 3.125 Gb/s is an example of a third transmission rate.

The optical module switch device 100 transmits a signal (information included in a packet or the like) received from the outside via the optical cable OC to the logic unit LOGIC via the SERDES_H and the SERDES_L. The optical module switch device 100 transmits the signal including the information of the packet or the like to any one of the optical modules OM via the SERDES_L and the SERDES_H according to the routing processing performed by the logic unit LOGIC. The optical module OM converts the transmitted signal into an optical signal, and outputs the optical signal to the optical cable OC.

In this embodiment, by arranging each SERDES_H on the outer periphery portion of the package PKG, it is possible to shorten a distance from the optical module OM coupled to each SERDES_H. With this configuration, it is possible to minimize a length of the wire coupling each SERDES_H and the optical module OM. Since it is possible to minimize a length of a wire through which the fastest signal (100 Gb/s) in FIG. 1 is transmitted, it is possible to reduce distortion of the transmitted signal. As a result, it is possible to greatly simplify a circuit that corrects distortion, which is used to correctly determine a logical value (1 or 0) on a signal reception side, and to reduce power consumption.

Furthermore, by minimizing the length of the wire coupling each SERDES_H and the optical module OM, it is possible to suppress disturbance of a waveform due to an influence of noise or the like of the signal transmitted through the wire. With this configuration, for example, it is possible to turn off a retimer function mounted on the optical module OM for shaping disturbance of a waveform in a time direction of a signal transmitted from the SERDES_H. As a result, it is possible to reduce power consumption of the optical module OM to, for example, half of power consumption in a case where the retimer function is turned on.

Figure 2:
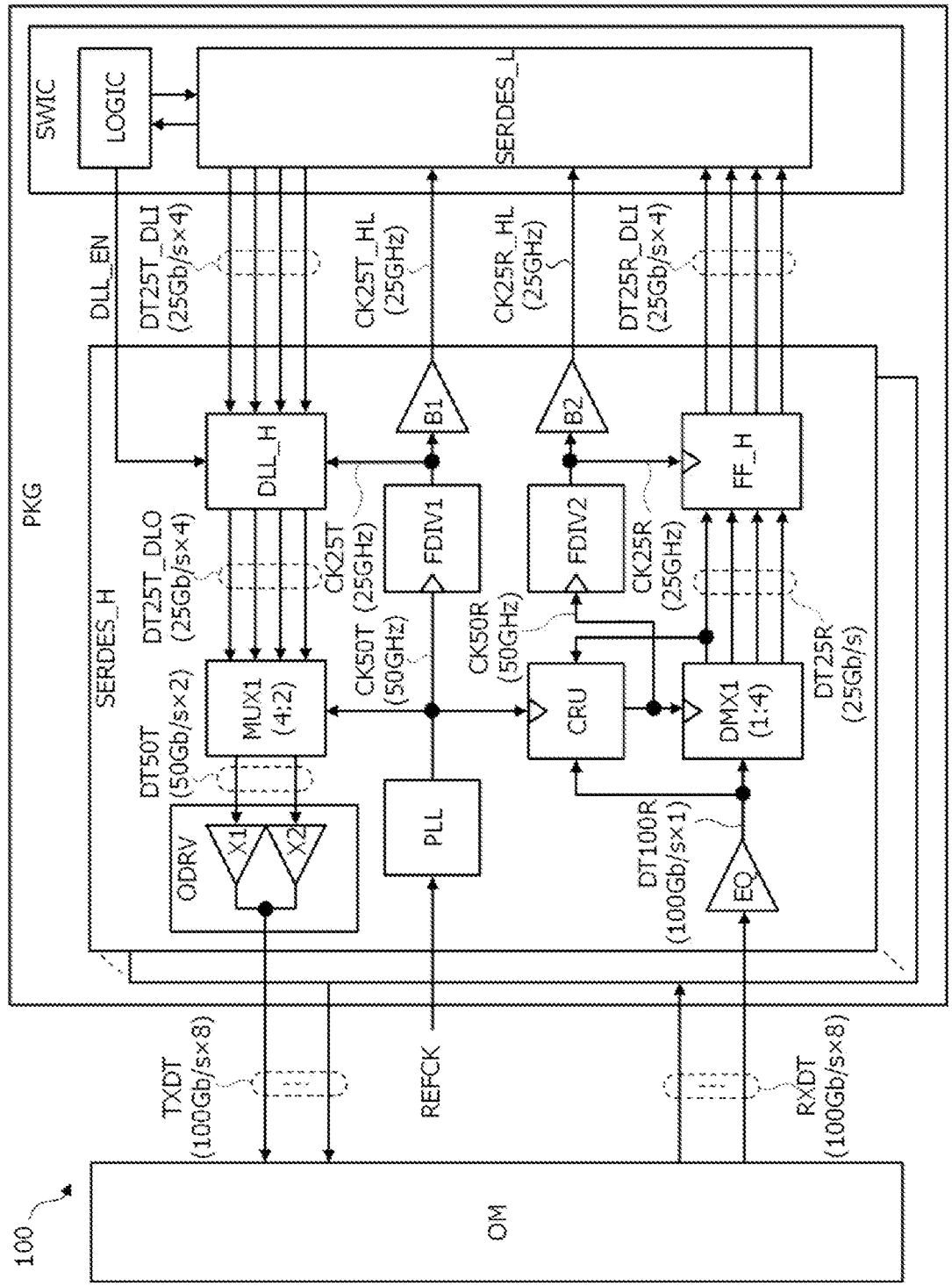
FIG. 2 is a circuit block diagram illustrating an example of a SERDES_H in FIG. 1.

FIG. 2 illustrates an example of the serializer/deserializer SERDES_H in FIG. 1. The one SERDES_H group indicated by a rectangle in FIG. 1 includes 64 SERDES_Hs in FIG. 2. The SERDES_H includes a delay locked loop DLL_H, a multiplexer MUX1, an output driver ODRV, a phase locked loop PLL, a frequency divider FDIV1, and a buffer B1. Furthermore, the SERDES_H includes an equalizer EQ, a clock recovery circuit CRU, a demultiplexer DMX1, a frequency divider FDIV2, a buffer B2, and a flip-flop FF_H.

The delay locked loop DLL_H operates while receiving an active-level enable signal DLL_EN from the logic unit LOGIC of the semiconductor chip SWIC. Then, the delay locked loop DLL_H matches a phase of each of 4-bit data signals DT25T_DLI received from the SERDES_L with a phase of a clock signal CK25T, and outputs the 4-bit data signals DT25T_DLI as 4-bit data signals DT25T_DLO.

The delay locked loop DLL_H is an example of a first phase locked loop. For example, a transmission rate of each of the data signals DT25T_DLI is 25 Gb/s, and a frequency of the clock signal CK25T is 25 GHZ. The data signal DT25T_DLI is an example of a second signal, and a signal line through which the data signal DT25T_DLI is transmitted is an example of a second signal line. The clock signal CK25T is an example of a first clock signal circuit.

The multiplexer MUX1 multiplexes the 4-bit data signals DT25T_DLO by 2 bits in synchronization with a clock signal CK50T, and outputs the multiplexed 4-bit data signals DT25T_DLO as 2-bit data signals DT50T. For example, a transmission rate of each of the data signals DT50T is 50 Gb/s, and a frequency of the clock signal CK50T is 50 GHZ.

The output driver ODRV converts the 2-bit data signals DT50T (each of which is binary) into a 4-value data signal TXDT, and outputs the 4-value data signal TXDT to the optical module OM. For example, the data signal TXDT output by the output driver ODRV is a pulse amplitude modulation 4 (PAM4) signal with a transmission rate of 100 Gb/s. Then, 8-bit data signals TXDT are output from eight SERDES_Hs to one optical module OM. The data signal TXDT is an example of a first signal, and a signal line through which the data signal TXDT is transmitted is an example of a first signal line.

The phase locked loop PLL receives a reference clock signal REFCK received from the outside, and generates the clock signal CK50T synchronized with the reference clock signal REFCK. The frequency divider FDIV1 divides a frequency of the clock signal CK50T of 50 GHz to generate the clock signal CK25T of 25 GHz. The buffer B1 outputs the clock signal CK25T to the SERDES_L as a clock signal CK25T_HL.

The equalizer EQ compensates a high frequency component of a data signal RXDT of 100 Gb/s received from the optical module OM, and outputs the data signal RXDT as a data signal DT100R of 100 Gb/s. For example, the data signal RXDT is a PAM4 signal. Note that the optical module OM outputs an 8-bit data signal RXDT to each of the eight SERDES_H. The data signal RXDT is an example of the first signal, and a signal line through which the data signal RXDT is transmitted is an example of the first signal line.

The clock recovery circuit CRU reproduces a clock superimposed on the data signal DT100R, and generates a clock signal CK50R having a rising edge at the center of a period of the data signal RXDT. The demultiplexer DMX1 outputs, in synchronization with the clock signal CK50R, the 4-bit data signal DT100R as 4-bit data signals DT25R. For example, a transmission rate of each bit of the data signal DT25R is 25 Gb/s.

The frequency divider FDIV2 divides a frequency of the clock signal CK50R of 50 GHz to generate a clock signal CK25R of 25 GHZ. The buffer B2 outputs the clock signal CK25R to the SERDES_L as a clock signal CK25R_HL. The flip-flop FF_H outputs the 4-bit data signals DT25R as 4-bit data signals DT25R_DLI to the SERDES_L in synchronization with the clock signal CK25R. For example, a transmission rate of each bit of the data signals DT25R_DLI is 25 Gb/s. The data signal DT25R_DLI is an example of the second signal, and a signal line through which the data signal DT25R_DLI is transmitted is an example of the second signal line. The clock signal CK25R_HL is an example of a second clock signal.

Figure 3:
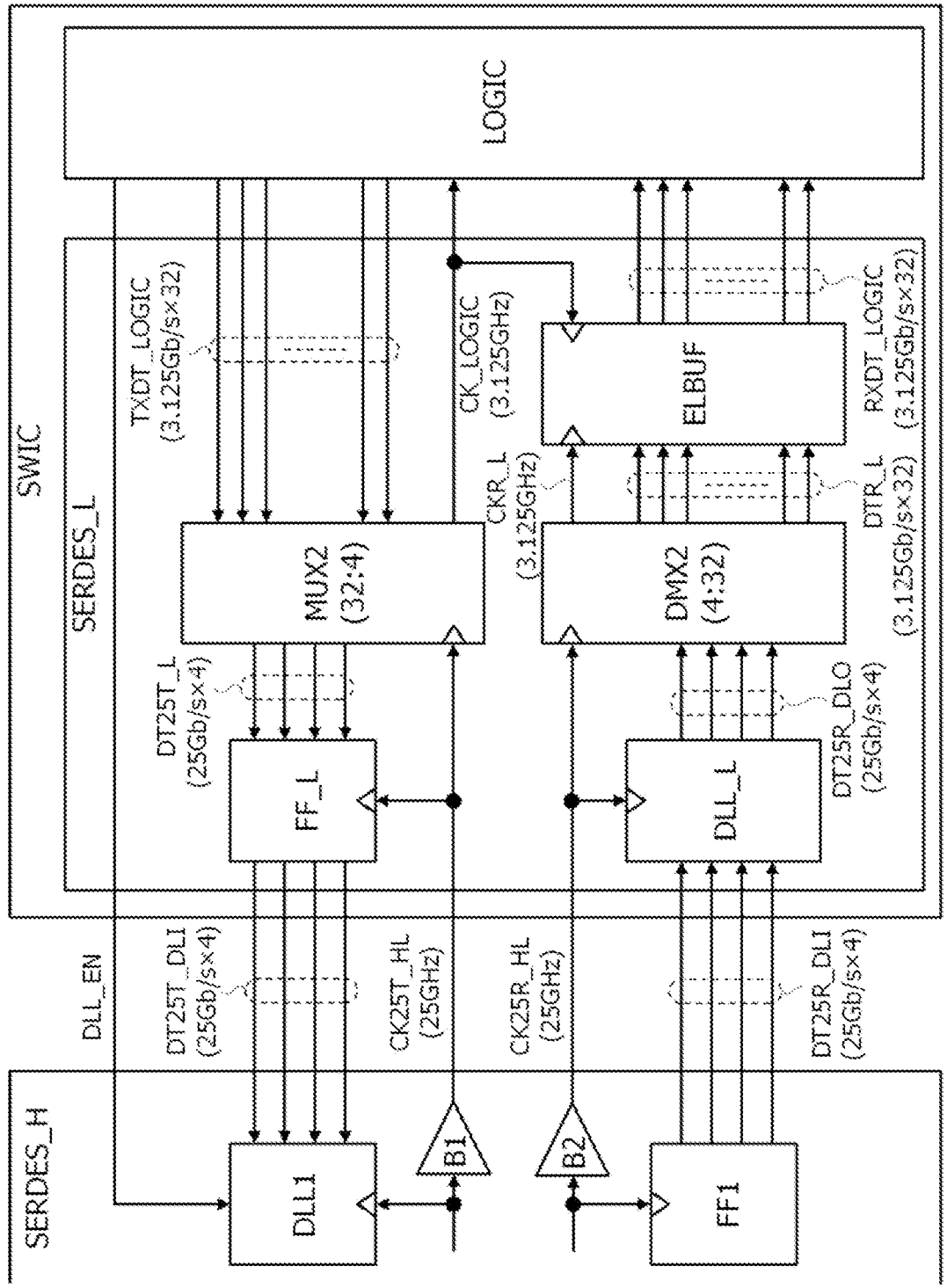
FIG. 3 is a circuit block diagram illustrating an example of a SERDES_L in FIG. 1.

FIG. 3 illustrates an example of the serializer/deserializer SERDES_L in FIG. 1. The one SERDES_L group indicated by a rectangle in FIG. 1 includes 128 SERDES_Ls in FIG. 3. The SERDES_L includes a multiplexer MUX2, a flip-flop FF_L, a delay locked loop DLL_L, a demultiplexer DMX2, and an elastic buffer ELBUF.

The multiplexer MUX2 parallel-serial converts 32-bit data signals TXDT_LOGIC in synchronization with the clock signal CK25T_HL from the SERDES_H, and outputs the parallel-serial converted 32-bit data signals TXDT_LOGIC as 4-bit data signals DT25T_L. For example, a transmission rate of each bit of the data signal TXDT- _LOGIC is 3.125 Gb/s, and a transmission rate of each bit of the data signal DT25T_L is 25 Gb/s. The data signal TXDT_LOGIC is an example of a third signal, and a signal line through which the data signal TXDT_LOGIC is transmitted is an example of a third signal line. Furthermore, the multiplexer MUX2 divides a frequency of the clock signal CK25T_HL to generate a clock signal CK_LOGIC of 3.125 GHZ, and outputs the clock signal CK_LOGIC to the logic unit LOGIC.

The flip-flop FF_L outputs the 4-bit data signals DT25T_L as the 4-bit data signals DT25T_DLI to the SERDES_H in synchronization with the Clock signal CK25T_HL. For example, the transmission rate of each bit of the data signal DT25T_DLI is 25 Gb/s.

The delay locked loop DLL_L matches a phase of each bit of the 4-bit data signals DT25R_DLI received from the SERDES_H with a phase of the clock signal CK25R_HL, and outputs the 4-bit data signals DT25R_DLI as 4-bit data signals DT25R_DLO. The delay locked loop DLL_L is an example of a second phase locked loop circuit. For example, a transmission rate of each bit of the data signal DT25R_DLO is 25 Gb/s.

The demultiplexer DMX2 serial-parallel converts each bit of the 4-bit data signals DT25R_DLO in synchronization with the clock signal CK25R_HL, and generates 32-bit data signals DTR_L. Furthermore, the demultiplexer DMX2 divides the clock signal CK25R_HL to generate a clock signal CKR_L of 3.125 GHz. For example, a transmission rate of each bit of the data signal DTR_L is 3.125 Gb/s.

The elastic buffer ELBUF synchronizes the 32-bit data signals DTR_L received from the demultiplexer DMX2 with the clock signal CK_LOGIC by using the clock signals CKR_L and CK_LOGIC. Then, the elastic buffer ELBUF outputs 32-bit data signals RXDT_LOGIC synchronized with the clock signal CK_LOGIC to the logic unit LOGIC. A transmission rate of each bit of the data signal RXDT_LOGIC is 3.125 Gb/s. The data signal RXDT_LOGIC is an example of the third signal, and a signal line through which the data signal RXDT_LOGIC is transmitted is an example of the third signal line.

Figure 4:
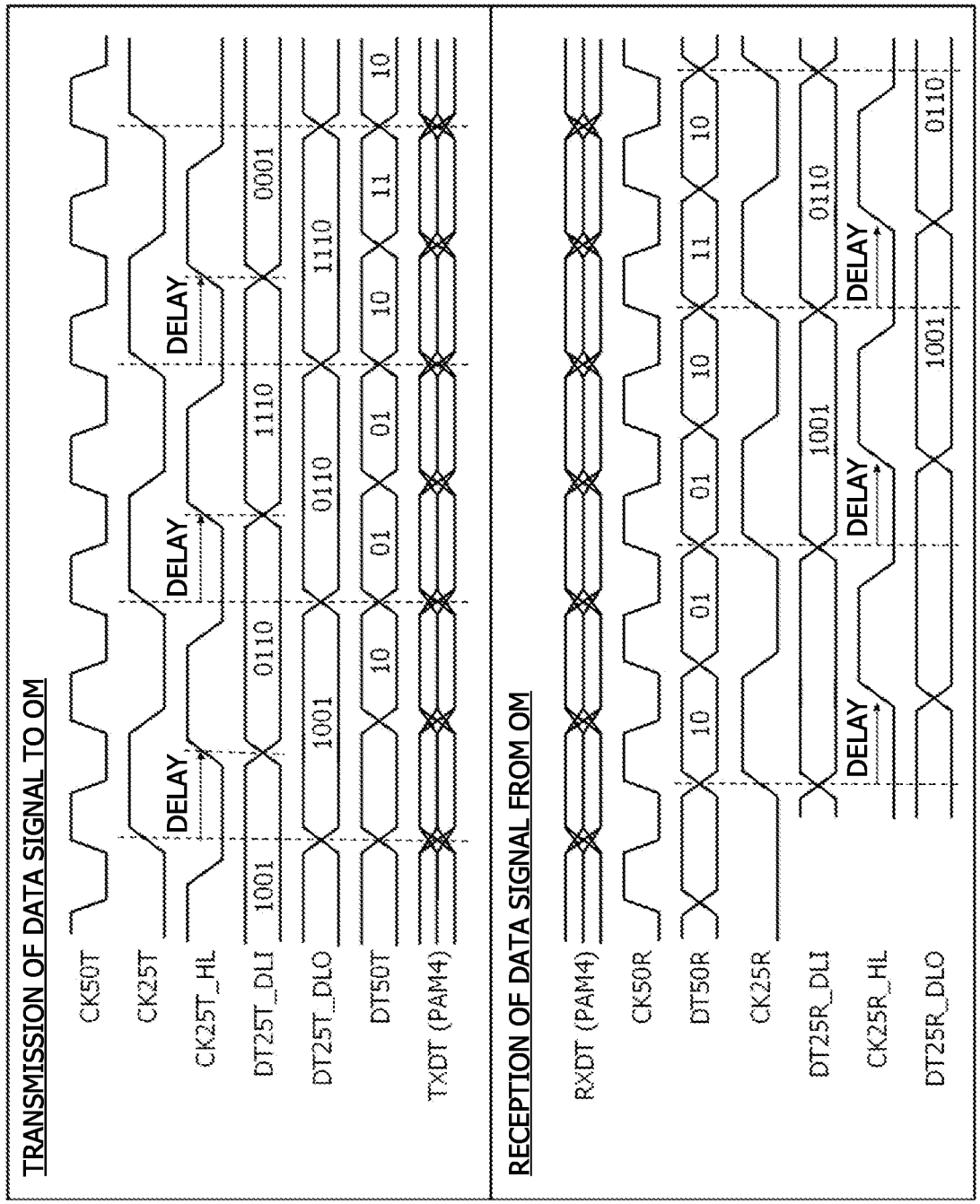
FIG. 4 is a timing diagram illustrating an outline of operation of the SERDES_H and the SERDES_L in FIGS. 2 and 3.

FIG. 4 illustrates an outline of operation of the SERDES_H and the SERDES_L in FIGS. 2 and 3. 4-digit numbers indicated in the data signals DT25T_DLI, DT25T_DLO, DT25R_DLI, and DT25R_DLO indicate 4-bit binary data. 2-digit numbers indicated in the data signals DT50T and DT50R indicate 2-bit binary data.

First, in a case where the data signal TXDT is transmitted to the optical module OM, the SERDES_L outputs the data signals DT25T_DLI to the SERDES_H in synchronization with the clock signal CK25T_HL received from the SERDES_H. A phase of the clock signal CK25T_HL is behind the phase of the clock signal CK25T used in the SERDES_H due to propagation delay or the like. Thus, the data signals DT25T_DLI are behind the clock signal CK25T.

The delay locked loop DLL_H of the SERDES_H adjusts the phase of the data signals DT25T_DLI, which is behind, by using the clock signal CK25T. With this configuration, even in a case where the signal lines wired between the SERDES_H and the SERDES_L are long, it is possible to generate the data signals DT25T_DLO synchronized with the clock signal CK25T. The multiplexer MUX1 multiplexes the 4-bit data signals DT25T_DLO to generate the two 2-bit data signals DT50T in synchronization with the clock signal CK50T. Then, the output driver ODRV converts the 2-bit data signals DT50T into the 4-value data signal TXDT (PAM4), and outputs the 4-value data signal TXDT (PAM4) to the optical module OM.

On the other hand, in a case where the data signal RXDT (PAM4) is received from the optical module OM, the equalizer EQ of the SERDES_H generates the data signal DT100R from the data signal RXDT. The clock recovery circuit CRU generates, based on the data signal DT100R, the clock signal CK50R having the rising edge at the center of the period of the data signal RXDT. The flip-flop FF_H of the SERDES_H outputs the data signals DT25R output from the demultiplexer DMX1 to the SERDES_L as the data signals DT25R_DLI in synchronization with the clock signal CK25R.

The delay locked loop DLL_L of the SERDES_L adjusts the phase of the data signal DT25R_DLI output from the SERDES_H by using the clock signal CK25R_HL. With this configuration, even in a case where the signal lines wired between the SERDES_H and the SERDES_L are long, it is possible to generate the data signals DT25R_DLO synchronized with the clock signal CK25R_HL.

Figure 5:
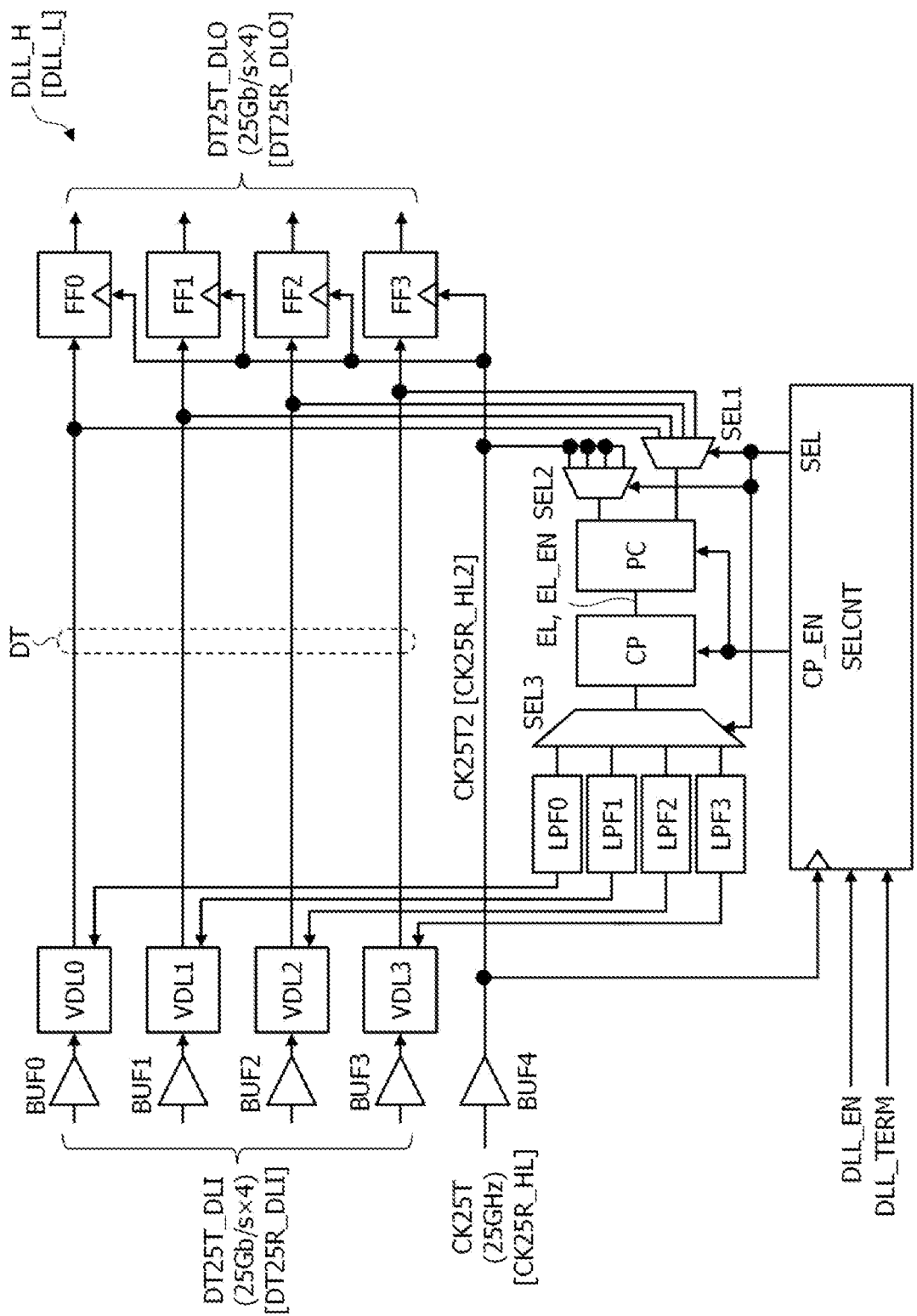
FIG. 5 is a circuit block diagram illustrating an example of a delay locked loop DLL_H in FIG. 2 and a delay locked loop DLL_L in FIG. 3.

FIG. 5 illustrates an example of the delay locked loop DLL_H in FIG. 2 and the delay locked loop DLL_L in FIG. 3. Since the delay locked loops DLL_H and DLL_L are identical circuits to each other, the delay locked loop DLL_H is described in FIG. 5. Note that, in the delay locked loop DLL_L, the data signals DT25T_DLI and DT25T_DLO are replaced with the data signals DT25R_DLI and DT25R_DLO indicated in square brackets, respectively. Furthermore, the clock signals CK25T and CK25T2 are replaced with the clock signals CK25R_HL and CK25R_HL2 indicated in square brackets, respectively.

The delay locked loop DLL_H includes five buffers BUF0 to BUF4, four variable delay circuits VDL0 to VDL3, and four flip-flops FF0 to FF3. Furthermore, the delay locked loop DLL_H includes selectors SEL1 and SEL2, a phase comparator PC, a charge pump CP, a selector SEL3, four low-pass filters LPF0 to LPF3, and a selection control unit SELCNT. The selector SEL1 is an example of a selection circuit. The phase comparator PC, the charge pump CP, and the low-pass filters LPF0 to LPF3 are examples of a delay amount determination circuit that determines an amount of delay of each of the variable delay circuits VDL0 to VDL3.

The buffers BUF0 to BUF3 output the 4-bit data signals DT25T_DLI to the variable delay circuits VDL0 to VDL3, respectively. The buffer BUF4 outputs the clock signal CK25T as the clock signal CK25T2.

Each of the variable delay circuits VDL0 to VDL3 adjusts an amount of delay of the received data signal DT25T_DLI according to a voltage received from each of the low-pass filters LPF0 to LPF3, and outputs the data signal DT25T_DLI as a data signal DT to each of the flip-flops FF0 to FF3. Each of the flip-flops FF0 to FF3 outputs the data signal DT with the amount of delay adjusted received from each of the variable delay circuits VDL0 to VDL3 as the data signal DT25T_DLO in synchronization with the clock signal CK25T2.

The selector SEL1 outputs any one of the data signals DT25T_DLI with the amount of delay adjusted to the phase comparator PC according to a selection signal SEL output from the selection control unit SELCNT. The selector SEL2 outputs the clock signal CK25T2 output from the buffer BUF4 to the phase comparator PC according to the selection signal SEL.

The phase comparator PC operates while an enable signal CP_EN output from the selection control unit SELCNT is at a valid level. The phase comparator PC compares phases of any one of the data signals DT with the amount of delay adjusted output from the selector SEL1 and the clock signal CK25T2 output from the selector SEL2. Then, the phase comparator PC outputs an early/late signal EL indicating a result of comparing the phases and an enable signal EL_EN to the charge pump CP.

The charge pump CP operates while both the enable signal CP_EN and the enable signal EL_EN are at a valid level. Then, the charge pump CP outputs a current corresponding to the early/late signal EL to the selector SEL3.

The selector SEL3 outputs the current output from the charge pump CP to any one of the low-pass filters LPF0 to LPF3 according to the selection signal SEL. Each of the low-pass filters LPF0 to LPF3 converts the current received via the selector SEL3 into a voltage, smooths the voltage, and outputs the voltage to each of the variable delay circuits VDL0 to VDL3.

The selection control unit SELCNT operates while the enable signal DLL_EN is at a valid level, and in synchronization with the clock signal CK25T2, sequentially updates a value of the selection signal SEL for each number of clock cycles corresponding to a period indicated by a period signal DLL_TERM. Furthermore, the selection control unit SELCNT sets the enable signal CP_EN to the valid level while sequentially updating the value of the selection signal SEL. An example of a circuit of the selection control unit SELCNT is illustrated in FIG. 6, and an example of operation of the selection control unit SELCNT is illustrated in FIG. 7.

Figure 6:
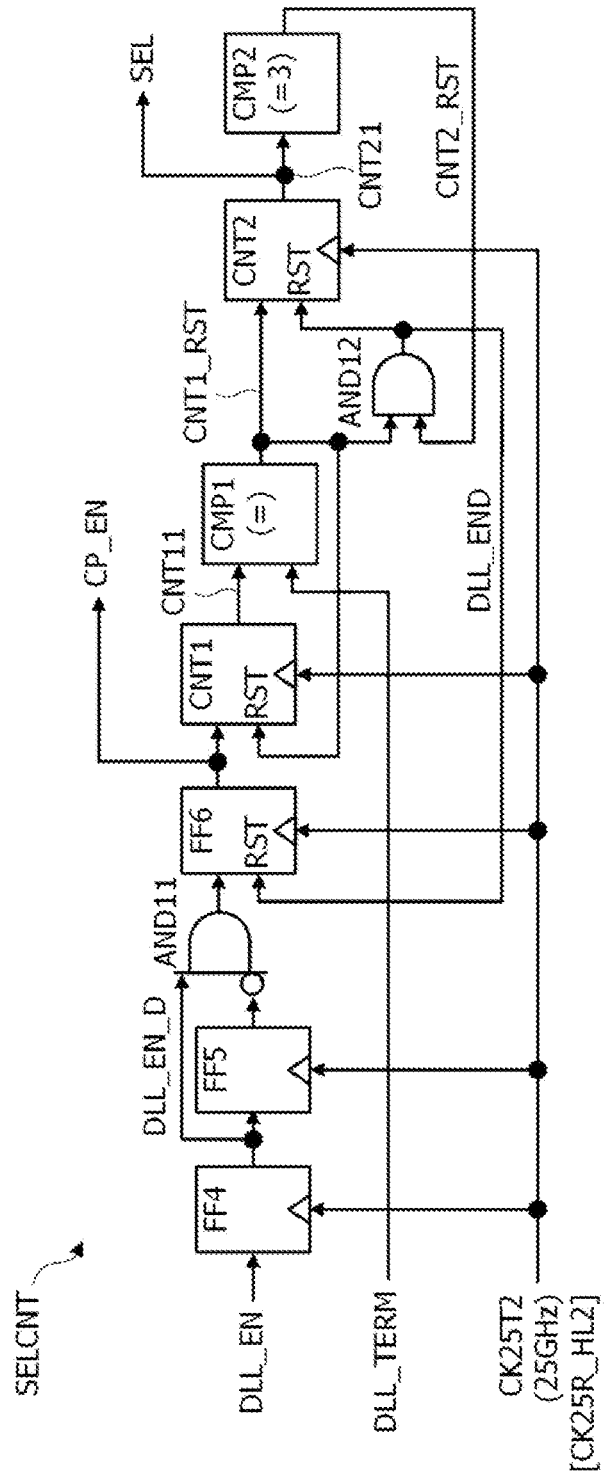
FIG. 6 is a circuit diagram illustrating an example of a selection control unit in FIG. 5.
Figure 7:
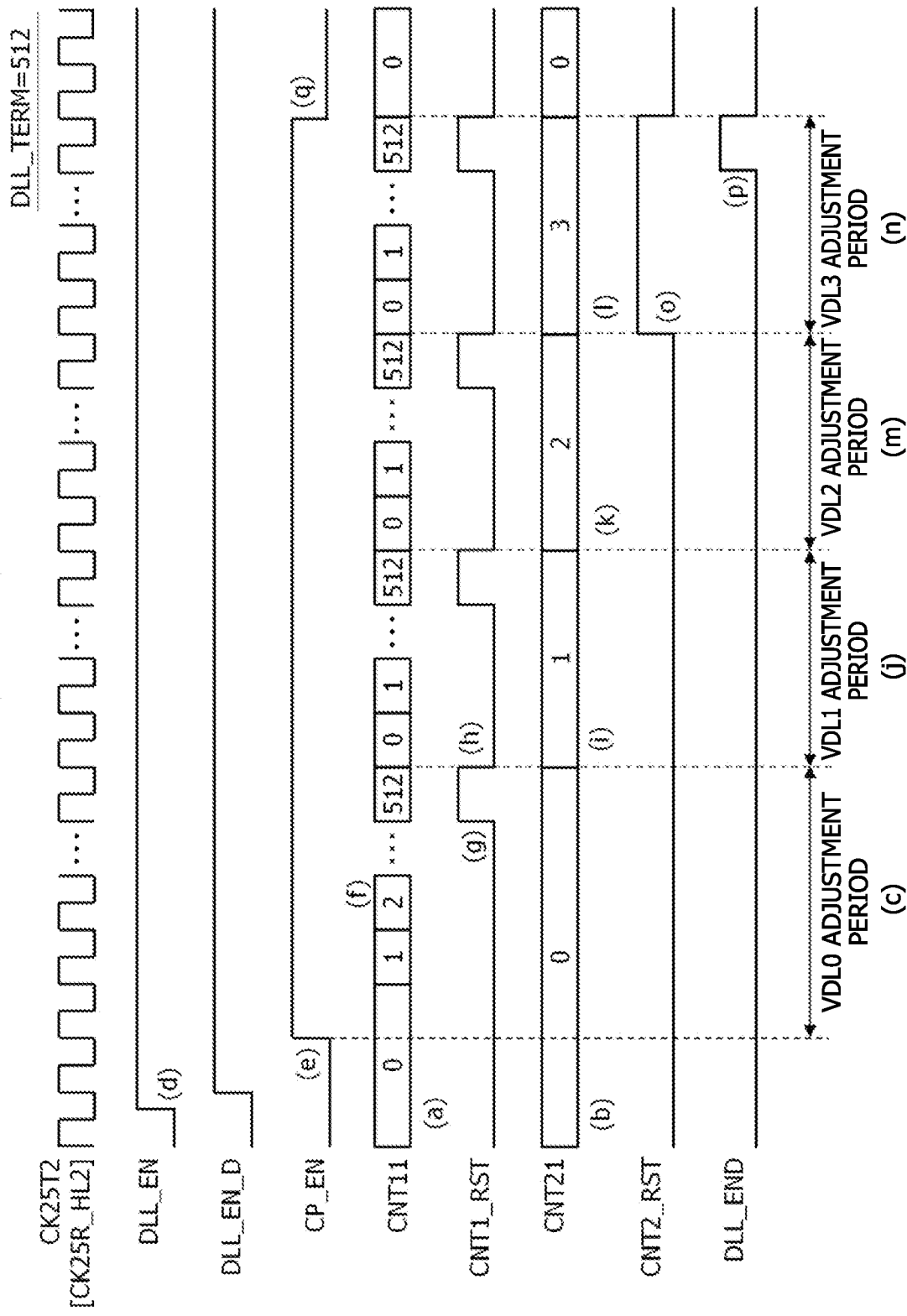
FIG. 7 is a timing diagram illustrating an example of operation of the selection control unit in FIG. 6.

FIG. 6 illustrates an example of the selection control unit SELCNT in FIG. 5. In FIG. 6, the selection control unit SELCNT included in the delay locked loop DLL_H is described. The selection control unit SELCNT included in the delay locked loop DLL_L operates in synchronization with the clock signal CK25R_HL2 indicated in the square bracket, instead of the clock signal CK25T2.

The selection control unit SELCNT includes flip-flops FF4 to FF6, AND circuits AND11 and AND12, counters CNT1 and CNT2, and comparators CMP1 and CMP2. The flip-flop FF4 outputs, in synchronization with the clock signal CK25T2, an enable signal DLL_EN_D that is delayed from the enable signal DLL_EN by one clock cycle. The flip-flop FF5 outputs, in synchronization with the clock signal CK25T2, the enable signal DLL_EN_D with the delay of one clock cycle.

The AND circuit AND11 receives the enable signal DLL_EN_D and logic obtained by inverting an output of the flip-flop FF5. Then, the AND circuit AND11 generates a high-level pulse signal synchronized with a rising edge of the enable signal DLL_EN_D, and outputs the high-level pulse signal to the flip-flop FF6.

The flip-flop FF6 operates in synchronization with the clock signal CK25T2, and sets the enable signal CP_EN to a high level, which is an active level, in response to the high-level pulse signal from the AND circuit AND11. Furthermore, the flip-flop FF6 sets the enable signal CP_EN to a low level, which is an inactive level, in response to a high level of an end signal DLL_END received at a reset terminal RST.

The counter CNT1 performs counting operation in synchronization with the clock signal CK25T2 during the period when the enable signal CP_EN is at the high level, and outputs a count value CNT11 obtained by the counting. The counter CNT1 resets the count value CNT11 in response to a high-level reset signal CNT1_RST received at a reset terminal RST.

The comparator CMP1 sets the reset signal CNT1_RST to a high level, which is an active level, when the count value CNT11 matches the number of clock cycles indicated by the period signal DLL_TERM. The AND circuit AND12 outputs, when the reset signals CNT1_RST and CNT2_RST are both at the high level, the high level to a reset terminal RST of the counter CNT2.

The counter CNT2 performs counting operation in synchronization with the clock signal CK25T2 during the period when the reset signal CNT1_RST is at the high level, which is the active level, and outputs a count value CNT21 obtained by the counting. The period when the reset signal CNT1_RST is at the high level, which is the active level, is one cycle period of the clock signal CK25T2 because the counter CNT1 is reset by the reset signal CNT1_RST. The count value CNT21 is output to the selectors SEL1 to SEL3 in FIG. 5 as the selection signal SEL. Furthermore, the counter CNT2 resets the count value CNT21 to "0" when receiving the high level from the AND circuit AND12 at the reset terminal RST. The comparator CMP2 sets the reset signal CNT2_RST to the high level when the count value CNT21 becomes "3".

FIG. 7 illustrates an example of the operation of the selection control unit SELCNT in FIG. 6. In the following, an example of the operation of the selection control unit SELCNT mounted in the delay locked loop DLL_H of the SERDES_H in FIG. 2 will be described. Note that the selection control unit SELCNT mounted in the delay locked loop DLL_L of the SERDES_L in FIG. 3 operates in synchronization with the clock signal CK25R_HL2.

It is assumed that the number of clock cycles indicated by the period signal DLL_TERM is "512". In an initial state in FIG. 7, the count value CNT11 of the counter CNT1 and the count value CNT21 of the counter CNT2 are initialized to "0" ((a) and (b) in FIG. 7). The selection control unit SELCNT outputs the count value CNT21 as the selection signal SEL. Thus, in the initial state, the selector SEL1 selects the data signal DT output from the variable delay circuit VDL0. Then, the delay locked loop DLL_H is set to a VDL0 adjustment period in which the amount of delay of the variable delay circuit VDL0 is adjusted while the count value CNT21 is "0" ((c) in FIG. 7).

The selection control unit SELCNT sets the enable signal CP_EN to a high level in the next clock cycle in which the high level of the enable signal DLL_EN is latched ((d) and (e) in FIG. 7). The counter CNT1 operates during the period when the enable signal CP_EN is at the high level, and updates the count value CNT11 by "1" in synchronization with the clock signal CK25T2 ((f) in FIG. 7).

The comparator CMP1 in FIG. 6 sets the reset signal CNT1_RST to the high level based on that the count value CNT11 becomes "512" ((g) in FIG. 7). Thereafter, the counter CNT1 resets the count value CNT11 to "0" by the high level of the reset signal CNT1_RST. The comparator CMP1 sets the reset signal CNT1_RST to a low level based on the change of the count value CNT11 from "512" to "0" ((h) in FIG. 7). The counter CNT2 stops the counting operation while the reset signal CNT1_RST is at the low level.

The counter CNT2 operates during the period when the reset signal CNT1_RST is at the high level, and updates the count value CNT21 from "0" to "1" in synchronization with the clock signal CK25T2 ((i) in FIG. 7). With this configuration, the selection control unit SELCNT switches the selection signal SEL from "0" to "1". The delay locked loop DLL_H ends the VDL0 adjustment period, and starts a VDL1 adjustment period for adjusting the amount of delay of the variable delay circuit VDL1 ((j) in FIG. 7).

Thereafter, each time the reset signal CNT1_RST is set to the high level, the count value CNT21 is updated by "1" ((k) and (l) in FIG. 7). Then, the delay locked loop DLL_H sequentially starts a VDL2 adjustment period for adjusting the amount of delay of the variable delay circuit VDL2 and a VDL3 adjustment period for adjusting the amount of delay of the variable delay circuit VDL3 ((m) and (n) in FIG. 7).

The comparator CMP3 sets the reset signal CNT2_RST to a high level based on that the count value CNT21 becomes "3" ((o) in FIG. 7). The AND circuit AND12 sets, when the reset signals CNT1_RST and CNT2_RST are both at the high level, the end signal DLL_END to the high level ((p) in FIG. 7). With this configuration, the enable signal CP_EN changes to a low level, and the adjustment of the amount of delay of each of the variable delay circuits VDL0 to VDL3 ends ((q) in FIG. 7).

The delay locked loops DLL_H and DLL_L of this embodiment sequentially perform the adjustment of the amounts of delay of the variable delay circuits VDL0 to VDL3 in a time-division manner. Thus, phases of 4-bit data signal DT may be adjusted by one phase comparator PC and one charge pump CP. As a result, a circuit scale of the delay locked loops DLL_H and DLL_L may be reduced compared to the case where the phase comparator PC and the charge pump CP are included for each piece of 4-bit data.

In the example illustrated in FIG. 7, each of the VDL0 adjustment period to the VDL3 adjustment period may be set to an optional number of clock cycles indicated by the period signal DLL_TERM. For example, in a case where the period signal DLL_TERM is set to "128", each of the VDL0 adjustment period to the VDL3 adjustment period is set to 128 clock cycles.

Figure 8:
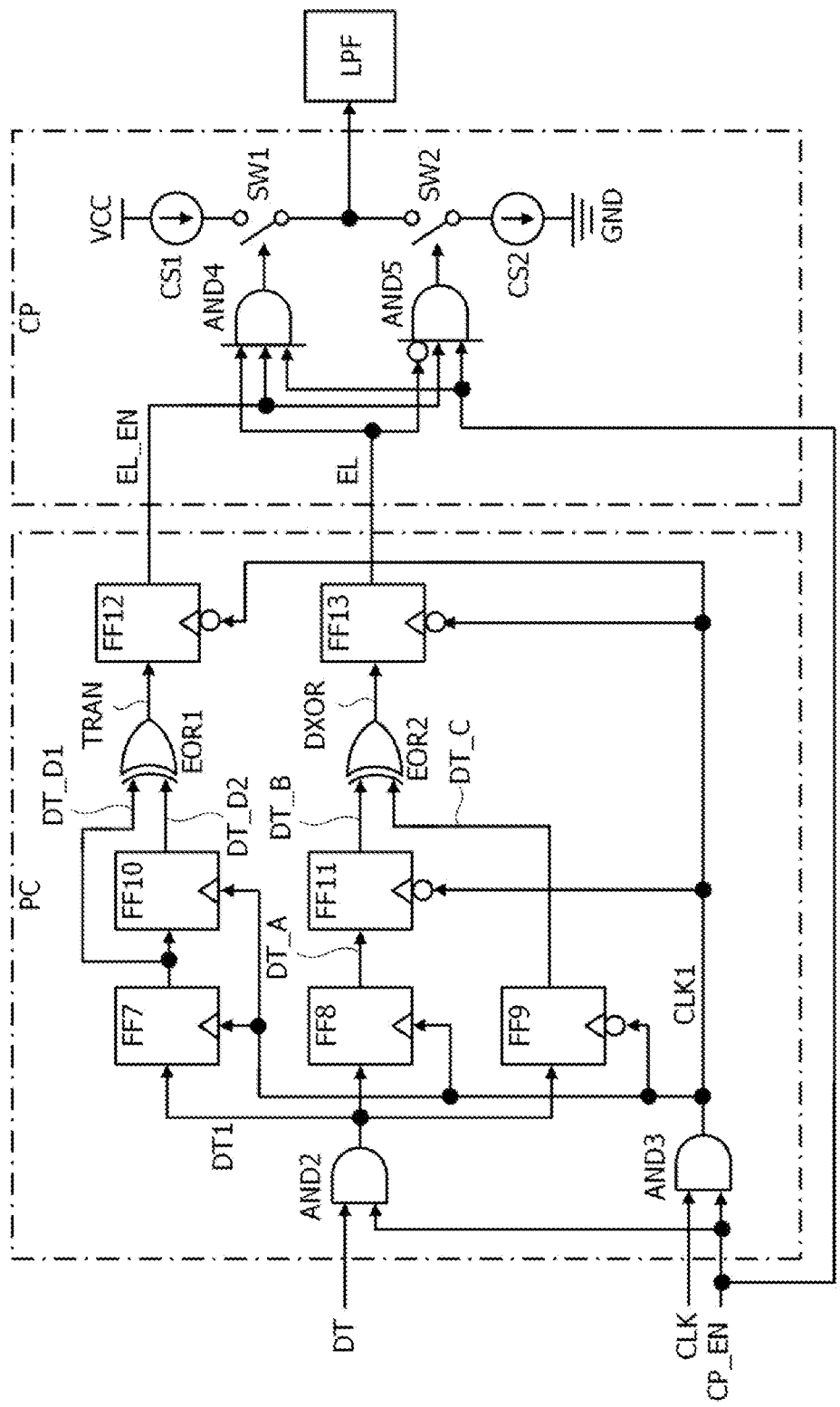
FIG. 8 is a circuit diagram illustrating an example of a phase comparator and a charge pump in FIG. 5.

FIG. 8 illustrates an example of the phase comparator PC and the charge pump CP in FIG. 5. The phase comparator PC includes 2-input AND circuits AND2 and AND3, flip-flops FF7 to FF13, and exclusive OR circuits EOR1 and EOR2. The charge pump CP includes 3-input AND circuits AND4 and AND5, current sources CS1 and CS2, and switch circuits SW1 and SW2. For example, a clock signal CLK is 25 GHZ.

In the phase comparator PC, the AND circuit AND2 outputs the data signal DT with the amount of delay adjusted selected by the selector SEL1 to the flip-flops FF7, FF8, and FF9 as a data signal DT1, during the period when the enable signal CP_EN is at the high level.

The AND circuit AND3 outputs the clock signal CLK as a clock signal CLK1 to clock terminals of the flip-flops FF7 to FF13 during the period when the enable signal CP_EN is at the high level. Note that the clock terminals of the flip-flops FF9, FF11, FF12, and FF13 receive logic obtained by inverting the clock signal CLK1 output from the AND circuit AND3.

The flip-flop FF7 outputs the data signal DT1 as a data signal DT_D1 in synchronization with a rising edge of the clock signal CLK1. The flip-flop FF8 outputs the data signal DT1 as a data signal DT_A in synchronization with the rising edge of the clock signal CLK1. The flip-flop FF9 outputs the data signal DT1 as a data signal DT_C in synchronization with a falling edge of the clock signal CLK1.

The flip-flop FF10 outputs the data signal DT_D1 as a data signal DT_D2 in synchronization with the rising edge of the clock signal CLK1. The flip-flop FF11 outputs the data signal DT_A as a data signal DT_B in synchronization with the falling edge of the clock signal CLK1.

The OR circuit EOR1 outputs an exclusive OR of the data signals DT_D1 and DT_D2 as a transition detection signal TRAN. The OR circuit EOR2 outputs an exclusive OR of the data signals DT_B and DT_C as a delay signal DXOR. The flip-flop FF12 outputs the transition detection signal TRAN as the enable signal EL_EN in synchronization with the falling edge of the clock signal CLK1. The flip-flop FF13 outputs the delay signal DXOR as the early/late signal EL in synchronization with the falling edge of the clock signal CLK1.

In the charge pump CP, the AND circuit AND4 outputs a high level when the early/late signal EL is at the high level during a high-level period of the enable signals CP_EN and EL_EN. The AND circuit AND5 outputs a high level when the early/late signal EL is at a low level during the high-level period of the enable signals CP_EN and EL_EN.

The current source CS1, the switch circuits SW1 and SW2, and the current source CS2 are coupled in series between a power supply line VCC and a ground line GND. An input of a low-pass filter LPF is coupled to a node between the switch circuits SW1 and SW2. The switch circuit SW1 is turned on during the period when the AND circuit AND4 outputs the high level, and couples the current source CS1 to the low-pass filter LPF. The switch circuit SW2 is turned on during the period when the AND circuit AND5 outputs the high level, and couples the current source CS2 to the low-pass filter LPF.

With this configuration, when the enable signals CP_EN and EL_EN are at the high level and the early/late signal EL is at the high level, a current flows from the current source CS1 to the input of the low-pass filter LPF. When the enable signals CP_EN and EL_EN are at the high level and the early/late signal EL is at the low level, a current flows from the input of the low-pass filter LPF to the current source CS2.

Note that, in a case where the phases of the 4-bit data signal DT are adjusted in parallel, each of the SERDES_H and the SERDES_L has four sets of the circuit configurations in FIG. 8. Therefore, each of the SERDES_H and the SERDES_L in this embodiment may reduce the circuit scale compared to the case where the phases of the 4-bit data signal DT are adjusted in parallel.

Figure 9:
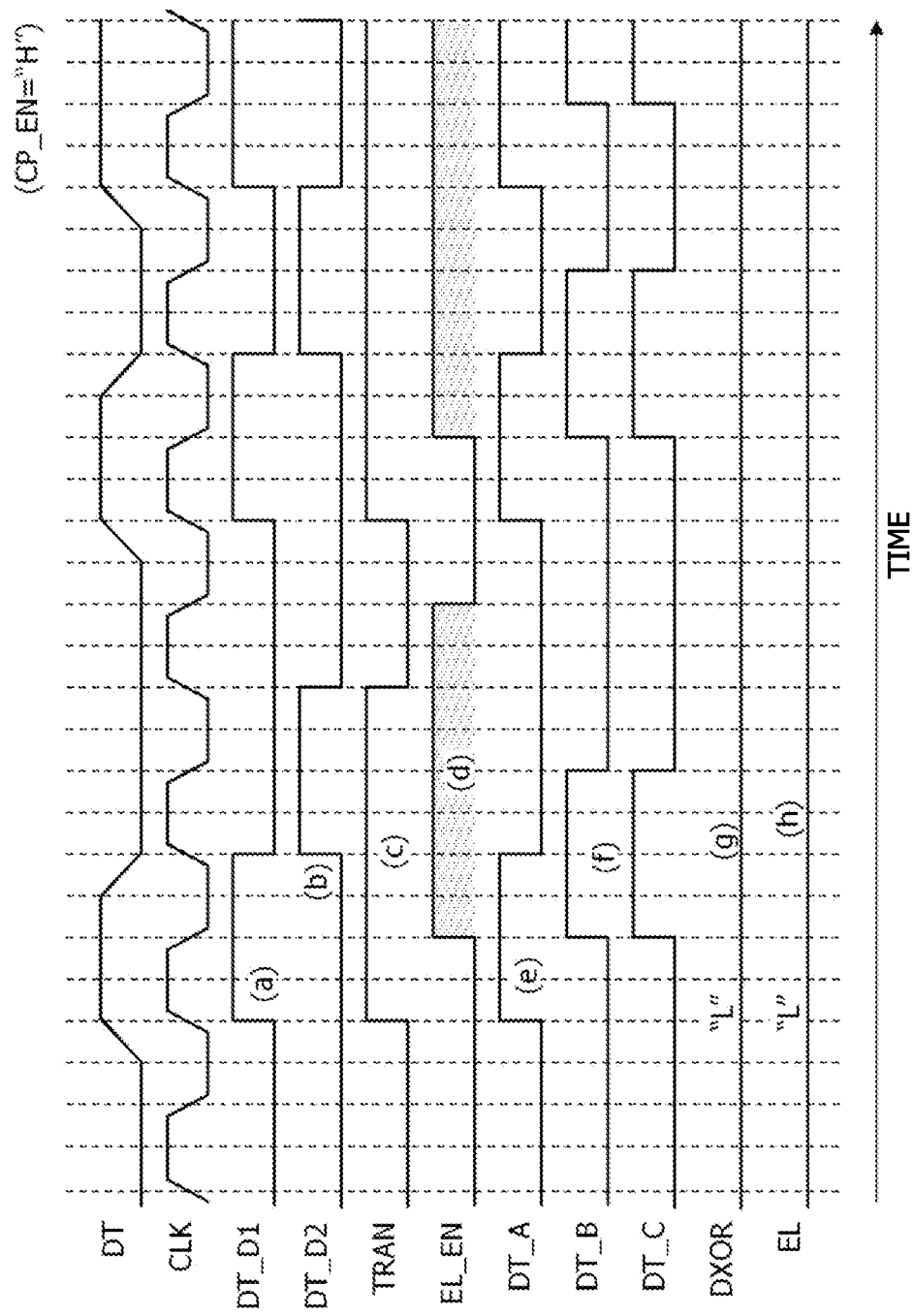
FIG. 9 is a timing diagram illustrating an example of operation in a case where a phase of a data signal is ahead of a phase of a clock signal in the phase comparator in FIG. 8.

FIG. 9 illustrates an example of the operation in a case where a phase of the data signal DT is ahead of a phase of the clock signal CLK in the phase comparator PC in FIG. 8. For example, the fact that the phase of the data signal DT is ahead of the phase of the clock signal CLK indicates that a rising edge of the data signal DT is in a low-level period of the clock signal CLK. Note that in FIG. 9, the enable signal CP_EN is set to a high level "H".

The data signal DT_D1 is set to a logic level of the data signal DT at a rising edge of the clock signal CLK ((a) in FIG. 9). For example, the data signal DT_D1 is set to a high level within half a clock cycle from the rising edge of the data signal DT. The data signal DT_D2 is set to a logic level delayed from the data signal DT_D1 by one clock cycle ((b) in FIG. 9).

The transition detection signal TRAN detects transition of the data signal DT whose phase is to be compared, and is therefore set to a high level in a case where levels of the continuous data signal DT_D1 and data signal DT_D2 are different ((c) in FIG. 9). The enable signal EL_EN is set to a logic level delayed from the transition detection signal TRAN by half a clock cycle ((d) in FIG. 9).

Since the enable signal CP_EN is set to the high level "H", the high-level period of the enable signal EL_EN becomes an operation period of the charge pump CP. For example, the high-level period of the enable signal EL_EN becomes a determination period for determining advance or delay of the phase of the data signal DT.

The data signal DT_A has the same waveform as the data signal DT_D1 ((e) in FIG. 9). In a case where the phase of the data signal DT is ahead of the phase of the clock signal CLK, the data signals DT_B and DT_C transition to a high level in synchronization with a falling edge of the clock signal CLK and have the same waveform as each other ((f) in FIG. 9).

Thus, the delay signal DXOR and the early/late signal EL are maintained at the low level ((g) and (h) in FIG. 9). The early/late signal EL at the low level indicates that the phase of the data signal DT is ahead of the phase of the clock signal CLK.

The charge pump CP in FIG. 8 turns off the switch circuit SW1 and turns on the switch circuit SW2 in a case where the early/late signal EL is at the low level. With this configuration, charges are discharged from the input of the low-pass filter LPF to the ground line GND, and the low-pass filter LPF causes the corresponding variable delay circuit VDL (any one of VDL0 to VDL3) to increase the amount of delay.

Figure 10:
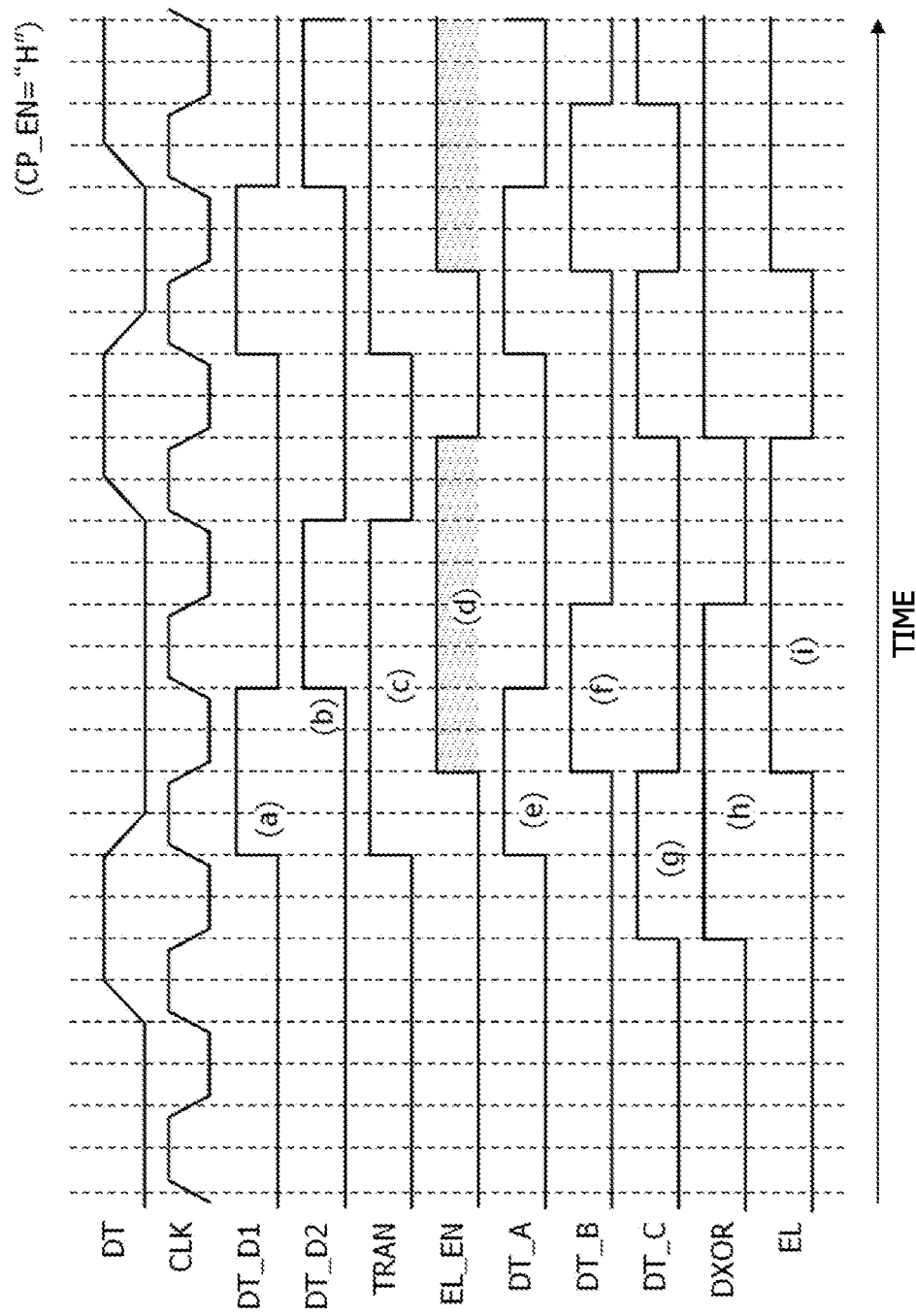
FIG. 10 is a timing diagram illustrating an example of operation in a case where the phase of the data signal is behind the phase of the clock signal in the phase comparator in FIG. 8.

FIG. 10 illustrates an example of the operation in a case where the phase of the data signal DT is behind the phase of the clock signal CLK in the phase comparator PC in FIG. 8. Detailed description of operation similar to that in FIG. 9 will be omitted. For example, the fact that the phase of the data signal DT is behind the phase of the clock signal CLK indicates that the rising edge of the data signal DT is in a high-level period of the clock signal CLK. Note that, also in FIG. 10, the enable signal CP_EN is set to the high level "H".

As in FIG. 9, the data signal DT_D1 is set to the logic level of the data signal DT at the rising edge of the clock signal CLK ((a) in FIG. 10). Note that the data signal DT_D1 is set to the high level after half a clock cycle from the rising edge of the data signal DT. A timing relationship between the waveform of the data signal DT_D1 and the waveforms of the data signal DT_D2, the transition detection signal TRAN, and the enable signal EL_EN is the same as that in FIG. 9 ((b), (c), and (d) in FIG. 10).

The data signal DT_A has the same waveform as the data signal DT_D1 ((e) in FIG. 10). For example, the data signal DT_A is set to the high level after half a clock cycle from the rising edge of the data signal DT. The data signal DT_B is set to the high level after half a clock cycle from the rising edge of the data signal DT_A ((f) in FIG. 10).

The data signal DT transitions from the low level to the high level during the high-level period of the clock signal CLK. Thus, the data signal DT_C transitions to the high level in synchronization with the falling edge of the clock signal CLK immediately after the rising edge of the data signal DT ((g) in FIG. 10). For example, the waveform of the data signal DT_C is the same as that in FIG. 9.

As a result, the high-level periods of the data signals DT_B and DT_C are shifted from each other, and the delay signal DXOR and the early/late signal EL are sequentially set to the high level for two clock cycles ((h) and (i) in FIG. 10). The early/late signal EL at the high level indicates that the phase of the data signal DT is behind the phase of the clock signal CLK.

The charge pump CP in FIG. 8 turns on the switch circuit SW1 and turns off the switch circuit SW2 during the period when the early/late signal EL is at the high level. With this configuration, the input of the low-pass filter LPF is charged with charges, and the low-pass filter LPF causes the corresponding variable delay circuit VDL (any one of VDL0 to VDL3) to decrease the amount of delay.

Figure 16:
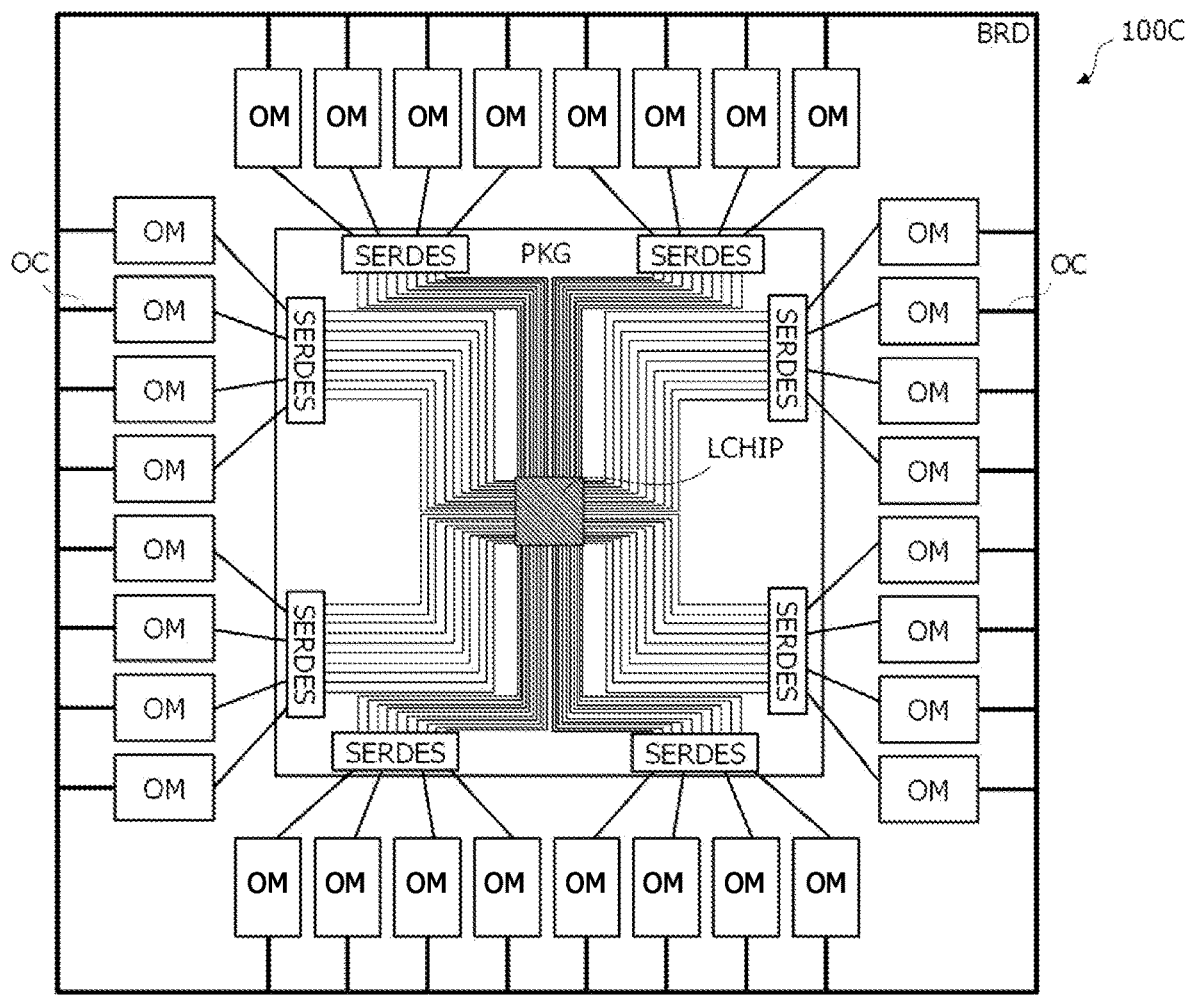
FIG. 16 is a plan view illustrating another example of the another optical module switch device.

As described above, in this embodiment, the optical module switch device 100 sequentially couples the two SERDES_H and SERDES_L having the different transmission rates from each other between the optical module OM and the logic unit LOGIC. With this configuration, the number of wires in the package PKG may be reduced compared to the case where the optical module OM and the logic unit LOGIC are coupled via one SERDES, which is illustrated in FIG. 16 described later. As a result, the length of the wire which is wired between the optical module OM and the SERDES_H and through which the fastest signal (100 Gb/s) is transmitted in the optical module switch device 100 may be minimized. For example, the SERDES_H may be arranged close to the optical module OM while suppressing the number of wires in the package PKG.

Since it is possible to minimize the length of the wire through which the fastest signal (100 Gb/s) is transmitted, it is possible to reduce distortion of the transmitted signal. As a result, it is possible to simplify the circuit that corrects distortion, which is used to correctly determine the logical value of the data on the signal reception side, and to reduce power consumption. Furthermore, by shortening the length of the signal lines, it is possible to reduce deterioration of the waveforms in the time direction of the signals transmitted to the optical module OM. With this configuration, it is possible to turn off the retimer function of the optical module OM, and to reduce power consumption of the optical module OM. As a result, it is possible to reduce power consumption of the optical module switch device 100.

The SERDES_H includes the delay locked loop DLL_H that synchronizes the phase of the signal transmitted from the SERDES_L with the clock signal CK25T used in the SERDES_H. The SERDES_L includes the delay locked loop DLL_L that synchronizes the phase of the signal transmitted from the SERDES_H with the clock signal CK25R_HL used in the SERDES_L. With this configuration, even in a case where the signal line coupling the SERDES_H and the SERDES_L is long, and in a case where there are manufacturing variations in the length of the signal line, it is possible to align the phases (transition timing) of the signals transmitted in parallel.

In the case of the delay locked loop DLL_H illustrated in FIG. 2, transition timing of the 4-bit data signals DT25T_DLI is adjusted to match a rising edge of the clock signal CK25T. With this configuration, it is possible to generate the data signals DT25T_DLO that are synchronized with the clock signal CK25T and have no phase variation among the four bits, and to correctly receive the data signals DT25T_DLO by the multiplexer MUX1, which is in the same clock domain as the clock signal CK25T. Furthermore, in the case of the delay locked loop DLL_L illustrated in FIG. 3, by adjusting transition timing of the 4-bit data signals DT25R_DLI to match a rising edge of the clock signal CK25R_HL, it is possible to generate the data signals DT25R_DLO that are synchronized with the clock signal CK25R_HL and have no phase variation among the four bits, and to correctly receive the data signals DT25R_DLO by the subsequent demultiplexer DMX2.

The delay locked loops DLL_H and DLL_L sequentially adjust the phases of the 4-bit data signal DT in a time-division manner. Thus, phases of 4-bit data signal DT may be adjusted by one phase comparator PC and one charge pump CP. As a result, a circuit scale of the delay locked loops DLL_H and DLL_L may be reduced compared to the case where the phase comparator PC and the charge pump CP are included for each piece of 4-bit data.

Figure 11:
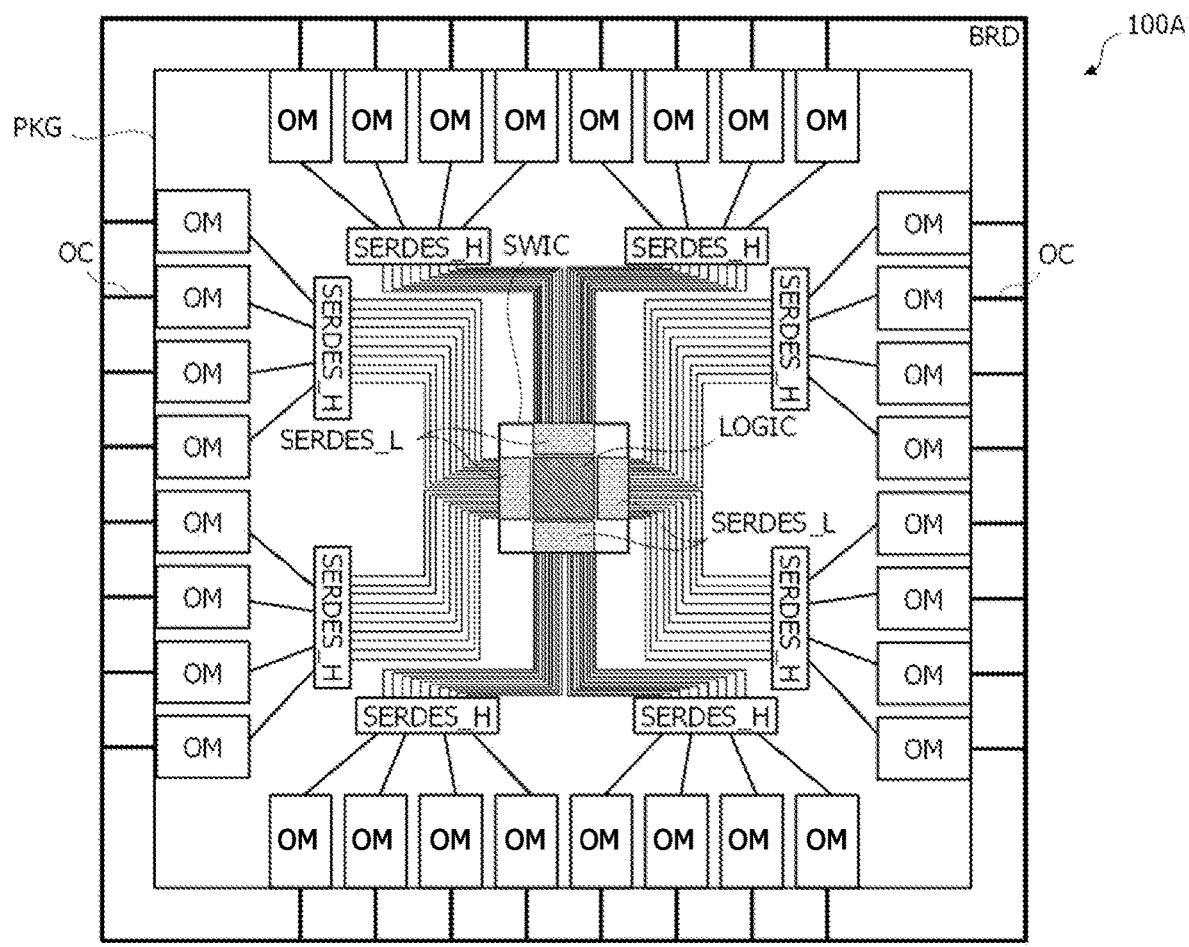
FIG. 11 is a plan view illustrating an example of an optical module switch device of another embodiment.

FIG. 11 illustrates an example of an optical module switch device of another embodiment. Elements that are the same as or similar to those in the embodiment described above are denoted by the same reference signs, and detailed description thereof will be omitted. An optical module switch device 100A illustrated in FIG. 11 includes a circuit board BRD on which a package PKG is mounted.

The package PKG includes an organic circuit board, and a plurality of optical modules OM, a plurality of SERDES_Hs, and a semiconductor chip SWIC that are mounted on the organic circuit board. The plurality of optical modules OM is mounted around the package PKG. Note that, although eight optical modules OM are arranged on each side of the rectangular package PKG in FIG. 11, 16 optical modules OM (eight on a front surface of the circuit board BRD and eight on a back surface of the circuit board BRD) are actually arranged on each side of the package PKG. As in FIG. 1, the optical modules OM on the back surface of the circuit board BRD and the serializers/deserializers SERDES_H are coupled via wires formed on the circuit board BRD, bumps coupling the circuit board BRD and the package PKG, and wires formed on the package PKG.

The optical modules OM are arranged on the package PKG and inside an outer periphery of the package PKG. The serializers/deserializers SERDES_H are arranged at positions close to the optical modules OM. The semiconductor chip SWIC is mounted in a central portion of the package PKG, and includes a plurality of SERDES_Ls and a logic unit LOGIC that performs routing processing. For example, the optical module switch device 100A has a circuit configuration similar to that of the optical module switch device 100 in FIG. 1 except that the optical modules OM are mounted on the package PKG. As illustrated in FIG. 11, the optical module switch device 100A has a form of co-package optics (CPO).

As described above, the optical module switch device 100A having the form of the CPO of this embodiment may also obtain effects similar to those of the embodiment described above. For example, since a length of a signal wire coupling the SERDES_H and the optical module OM may be shortened, and a length of a wire that transmits the fastest signal (100 Gb/s) may be minimized, it is possible to reduce distortion of the transmitted signal. As a result, it is possible to simplify the circuit that corrects distortion, which is used to correctly determine the logical value of the data on the signal reception side, and to reduce power consumption. Furthermore, it is possible to turn off a retimer function of the optical module OM, and to reduce power consumption of the optical module OM. As a result, it is possible to reduce power consumption of the optical module switch device 100A.

Figure 12:
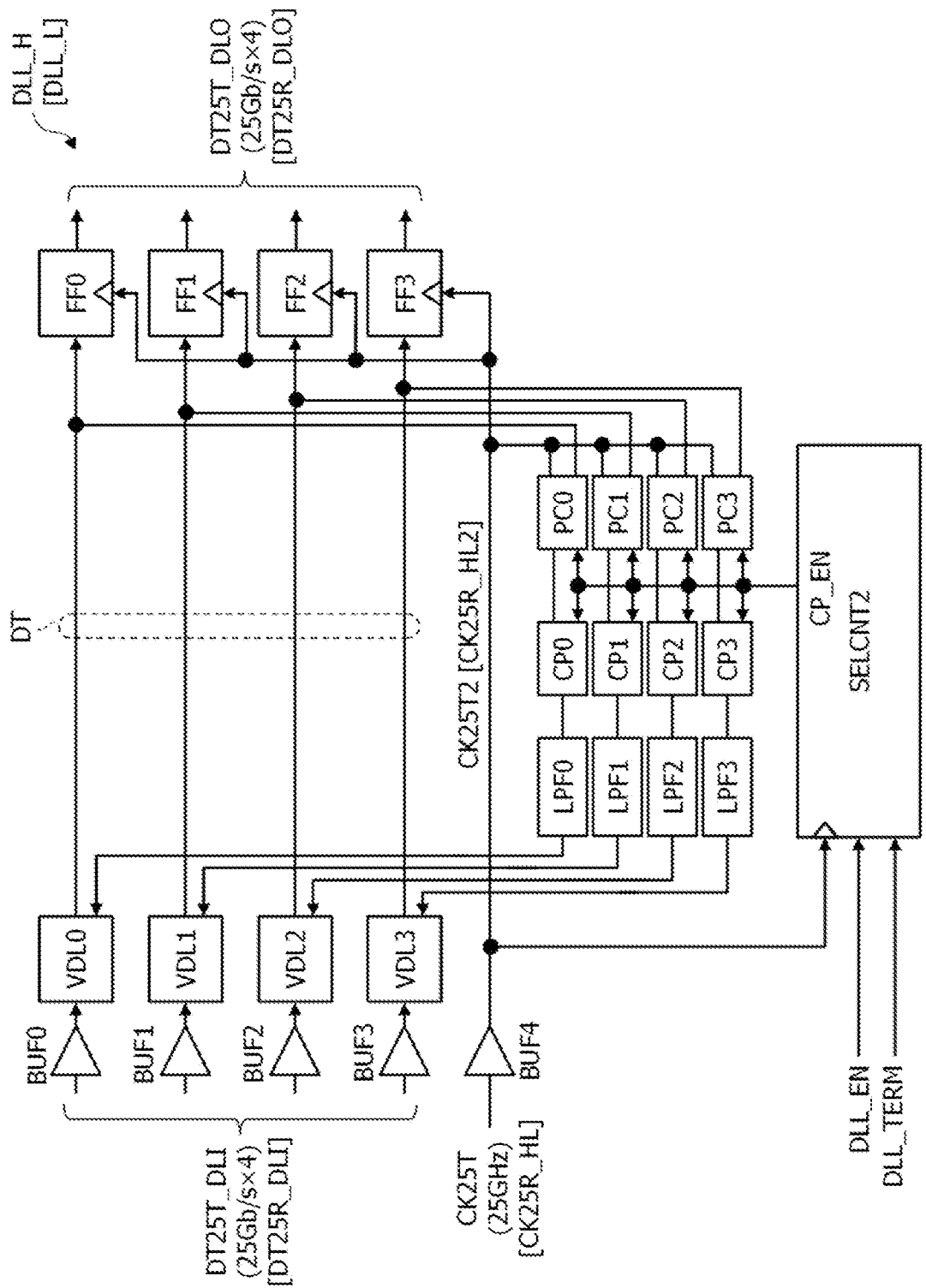
FIG. 12 is a circuit block diagram illustrating an example of delay locked loops mounted on a SERDES_H or a SERDES_L of the optical module switch device of the another embodiment.

FIG. 12 illustrates an example of delay locked loops DLL_H and DLL_L mounted on the SERDES_H and the SERDES_L of the optical module switch device of the another embodiment. Elements that are the same as or similar to those in FIG. 5 are denoted by the same reference signs, and detailed description thereof will be omitted. The delay locked loop DLL_H (or DLL_L) illustrated in FIG. 12 is mounted on the SERDES_H (or the SERDES_L) of the optical module switch device 100 in FIG. 1 or the optical module switch device 100A in FIG. 11.

Since the delay locked loops DLL_H and DLL_L are identical circuits to each other, the delay locked loop DLL_H is described. Note that, as in FIG. 5, in the delay locked loop DLL_L, data signals DT25T_DLI and DT25T_DLO are replaced with data signals DT25R_DLI and DT25R_DLO indicated in square brackets, respectively. Furthermore, clock signals CK25T and CK25T2 are replaced with clock signals CK25R_HL and CK25R_HL2 indicated in square brackets, respectively.

The delay locked loop DLL_H of this embodiment includes a selection control unit SELCNT2, phase comparators PC0 to PC3, and charge pumps CP0 to CP3 instead of the selection control unit SELCNT, the phase comparator PC, and the charge pump CP in FIG. 5. Furthermore, the delay locked loop DLL_H does not include the selectors SEL1, SEL2, and SEL3 illustrated in FIG. 5. Other configurations of the delay locked loop DLL_H are the same as or similar to those of the delay locked loop DLL_H in FIG. 5. The phase comparators PC0 to PC3, the charge pumps CP0 to CP3, and low-pass filters LPF0 to LPF3 are examples of a delay amount determination circuit that determines an amount of delay of each of variable delay circuits VDL0 to VDL3.

The phase comparator PC0 and the charge pump CP0 are provided corresponding to the low-pass filter LPF0. The phase comparator PC1 and the charge pump CP1 are provided corresponding to the low-pass filter LPF1. The phase comparator PC2 and the charge pump CP2 are provided corresponding to the low-pass filter LPF2. The phase comparator PC3 and the charge pump CP3 are provided corresponding to the low-pass filter LPF3.

Configurations of the phase comparators PC0 to PC3 and the charge pumps CP0 to CP3 are the same as or similar to those in FIG. 8. An enable signal CP_EN output by the selection control unit SELCNT2 is supplied to the phase comparators PC0 to PC3 and the charge pumps CP0 to CP3. With this configuration, the delay locked loop DLL_H (or DLL_L) in FIG. 12 may perform adjustment operation of the amounts of delay of the variable delay circuits VDL0 to VDL3 in parallel.

Figure 13:
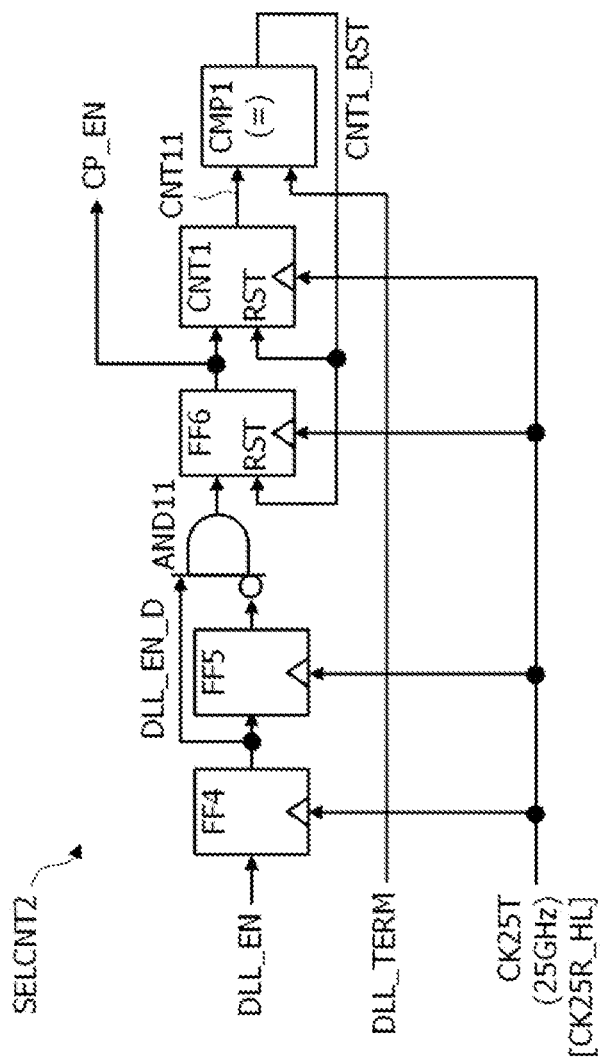
FIG. 13 is a circuit diagram illustrating an example of a selection control unit in FIG. 12.

FIG. 13 illustrates an example of the selection control unit SELCNT2 in FIG. 12. Elements that are the same as or similar to those in FIG. 6 are denoted by the same reference signs, and detailed description thereof will be omitted. The selection control unit SELCNT2 has a configuration similar to that of the selection control unit SELCNT in FIG. 6 except that the AND circuit AND12, the counter CNT2, and the comparator CMP3 are not included. Note that a reset terminal RST of a flip-flop FF6 receives a reset signal CNT1_RST.

Figure 14:
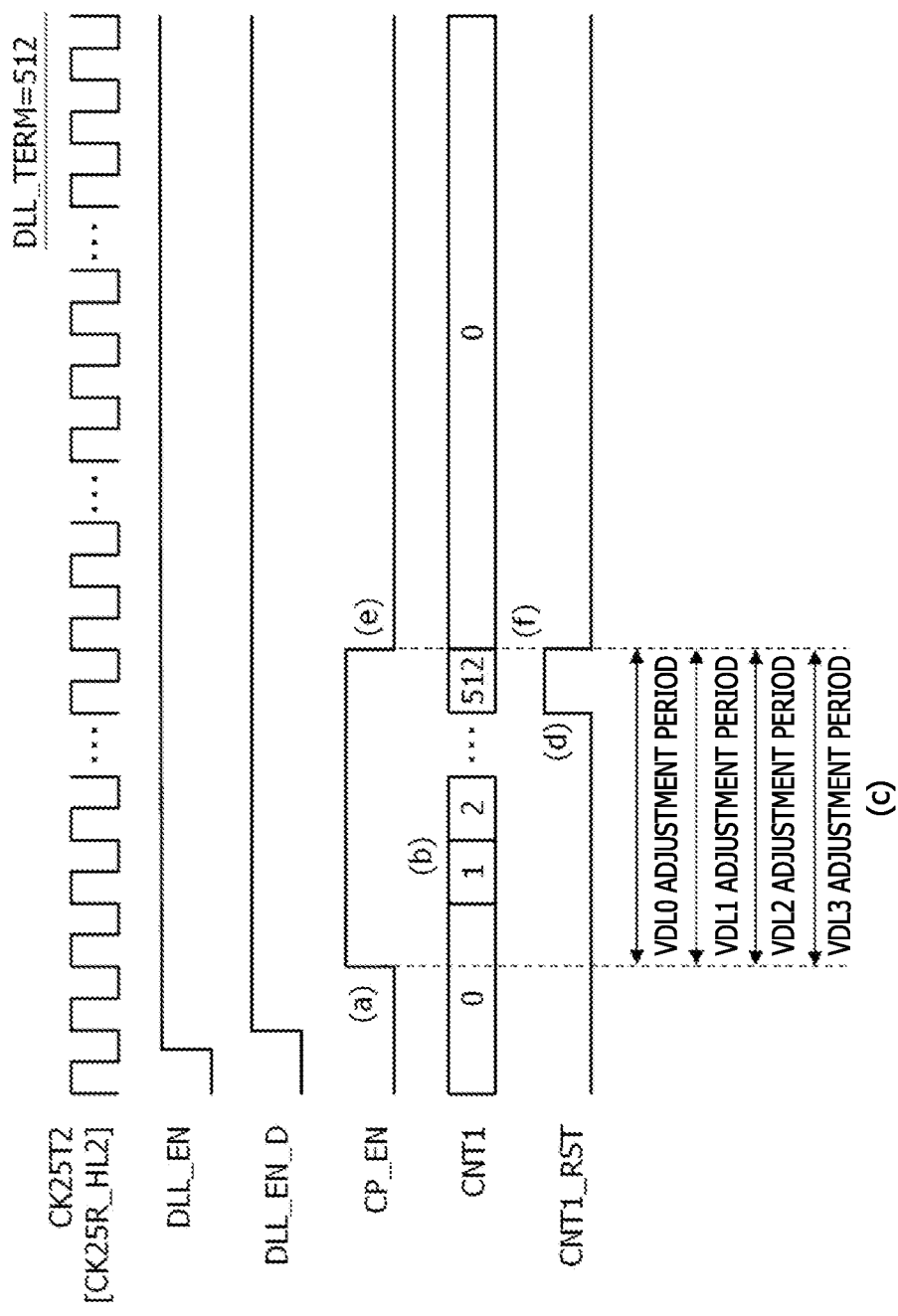
FIG. 14 is a timing diagram illustrating an example of operation of the selection control unit in FIG. 13.

FIG. 14 illustrates an example of the operation of the selection control unit in FIG. 13. Detailed description of operation which is the same as or similar to that in FIG. 7 will be omitted. It is assumed that the number of clock cycles indicated by a period signal DLL_TERM is "512". Waveforms of the clock signal CK25T2 (CK25R_HL2), the period signal DLL_TERM, and an enable signal DLL_EN_D are similar to those in FIG. 7.

The selection control unit SELCNT2 sets the enable signal CP_EN to a high level according to a change in an enable signal DLL_EN to a high level ((a) in FIG. 14). With this configuration, a counter CNT1 updates a count value CNT11 by "1" in synchronization with the clock signal CK25T2 ((b) in FIG. 14).

The phase comparators PC0 to PC3 and the charge pumps CP0 to CP3 in FIG. 12 operate in parallel during the period when the enable signal CP_EN is at the high level. For example, a VDL0 adjustment period to a VDL3 adjustment period are set so as to overlap each other ((c) in FIG. 14).

The delay locked loops DLL_H and DLL_L of this embodiment may perform the adjustment of the amounts of delay of the variable delay circuits VDL0 to VDL3 in parallel. Thus, a frequency of adjustment of the amounts of delay of the variable delay circuits VDL0 to VDL3 may be made higher than a frequency of adjustment by the selection control unit SELCNT illustrated in FIG. 7. As a result, compared to the delay locked loops DLL_H and DLL_L in FIG. 5, an adjustment time of a phase of a data signal DT may be shortened (¼ of FIG. 5).

The phase comparators PC0 to PC3 compare the phases of the data signals DT output from the variable delay circuits VDL0 to VDL3 and a phase of the clock signal CK25T2, respectively, and output results of the comparison to the charge pumps CP0 to CP3, respectively. The charge pumps CP0 to CP3 output voltages for adjusting the amounts of delay to the variable delay circuits VDL0 to VDL3, respectively, according to the results of the comparison by the phase comparators PC0 to PC3, respectively.

A comparator CMP1 sets the reset signal CNT1_RST to a high level based on that the count value CNT11 becomes "512" ((d) in FIG. 14). With this configuration, the enable signal CP_EN changes to a low level, and the count value CNT11 is reset to "0" ((e) and (f) in FIG. 14). The change of the enable signal CP_EN to the low level ends the VDL0 adjustment period to the VDL3 adjustment period.

As described above, in this embodiment as well, it is possible to obtain effects similar to those of the embodiment described above. For example, since a length of a wire which couples the SERDES_H and the optical module OM and through which a fast signal (100 Gb/s) is transmitted may be minimized, it is possible to reduce distortion of the transmitted signal. As a result, since it is possible to simplify the circuit that corrects distortion, which is used to correctly determine the logical value of the data on the signal reception side, it is possible to reduce power consumption. Furthermore, it is possible to turn off the retimer function of the optical module OM, and to reduce power consumption of the optical module OM. As a result, it is possible to reduce power consumption of the optical module switch device.

Moreover, in this embodiment, since it is possible to perform the adjustment of the amounts of delay of the variable delay circuits VDL0 to VDL3 in parallel, the frequency of adjustment of the amounts of delay of the variable delay circuits VDL0 to VDL3 may be made higher than the frequency of adjustment by the selection control unit SELCNT illustrated in FIG. 7. As a result, compared to the delay locked loops DLL_H and DLL_L in FIG. 5, the adjustment time of the phase of the data signal DT may be shortened.

Figure 15:
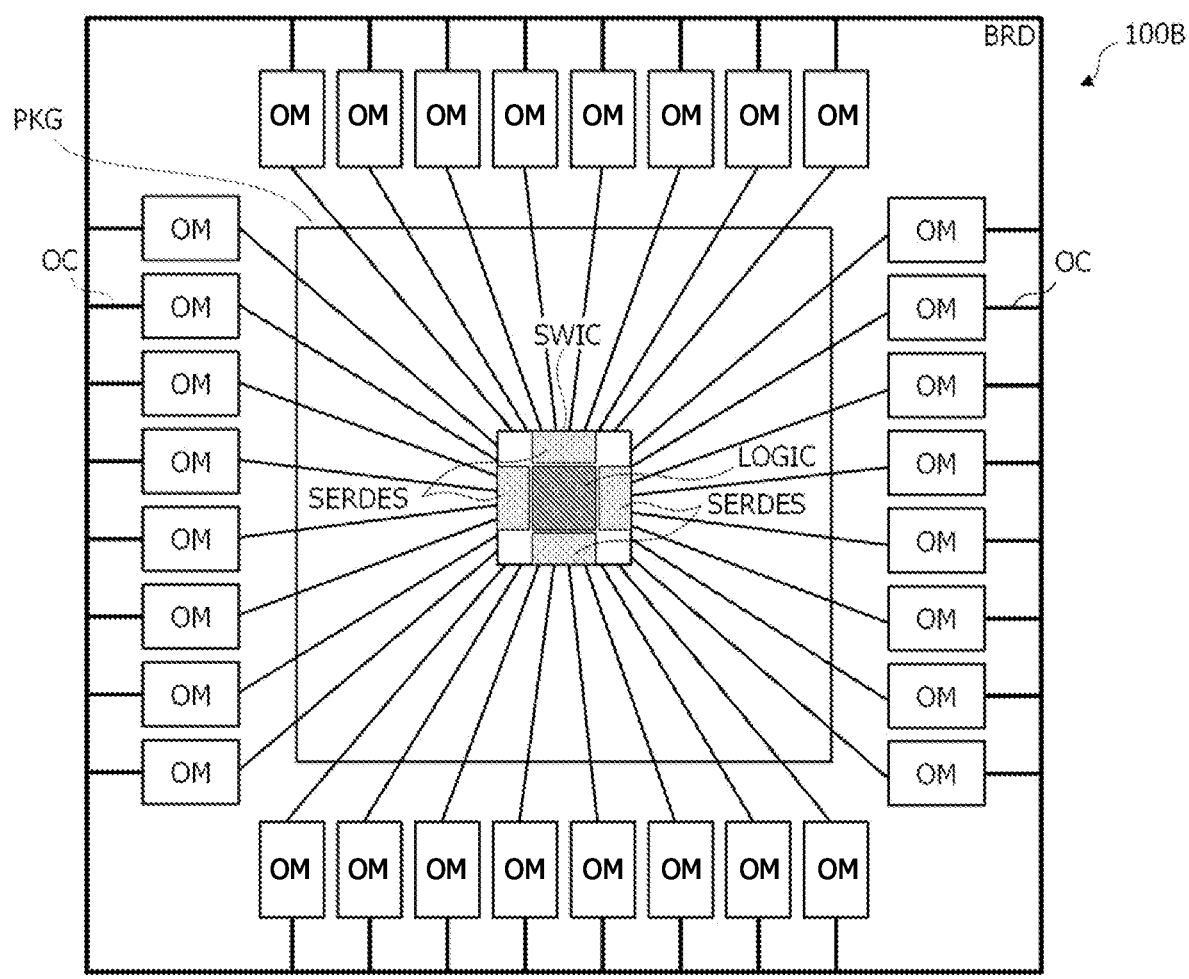
FIG. 15 is a plan view illustrating an example of another optical module switch device.

FIG. 15 illustrates an example of another optical module switch device. Elements that are the same as or similar to those in FIG. 1 are denoted by the same reference signs, and detailed description thereof will be omitted. An optical module switch device 100B illustrated in FIG. 15 includes a circuit board BRD on which a plurality of optical modules OM and a package PKG are mounted. For example, 16 optical modules OM (eight on a front surface and eight on a back surface) are mounted along each side of the rectangular circuit board BRD.

The package PKG includes an organic circuit board and a semiconductor chip SWIC mounted on the organic circuit board. The optical module switch device 100B has a form of NPO. The semiconductor chip SWIC includes a plurality of serializers/deserializers SERDES coupled to the plurality of optical modules OM and a logic unit LOGIC that performs routing processing. In the following, the serializers/deserializers SERDES will also be simply referred to as SERDESs.

The logic unit LOGIC is coupled to each of the plurality of SERDESs. Each SERDES is provided instead of the SERDES_H or the SERDES_L in FIG. 1. For example, 512 SERDESs are mounted on the semiconductor chip SWIC, and 128 SERDESs are arranged on each side of the semiconductor chip SWIC. One SERDES group indicated by a rectangle in FIG. 15 includes 128 SERDESs.

Each SERDES is coupled to each optical module OM via a 1-bit signal line for transmission and a 1-bit signal line for reception. A transmission rate of an electric signal that each SERDES transmits to or receives from the optical module OM is, for example, 100 Gb/s. Each optical module OM is coupled to 8 SERDESs.

The signal line coupling each SERDES to each optical module OM is longer than the signal line coupling each SERDES_H to each optical module OM in FIG. 1. Thus, distortion of the fastest 100 Gb/s signal increases, and a circuit that corrects distortion, which is used to correctly determine a logical value of data on a signal reception side, is needed. As a result, power consumption increases compared to that of the optical module switch device 100 in FIG. 1. Furthermore, since a retimer function mounted on the optical module OM is turned on in order to shape a waveform of a signal received by each optical module OM via the signal line, power consumption further increases.

Power consumption of 64 optical modules OM whose retimer function is turned on is, for example, 1250 W, and the total power of the SERDES needed for transmission and reception of the signal lines coupling each SERDES to each optical module OM is 250 W. Therefore, power consumption of the optical module switch device 100B is 1500 W.

On the other hand, in the optical module switch device 100 illustrated in FIG. 1 and the optical module switch device 100A illustrated in FIG. 11, the retimer function of the optical module OM is turned off. Furthermore, the signal line coupling each SERDES_H to each optical module OM is shorter than the signal line coupling each SERDES to each optical module OM in FIG. 15. Thus, the power consumption of the 64 optical modules OM is, for example, 625 W. The total power of the SERDES_H needed for transmission and reception of the signals between each SERDES_H and each optical module OM is 125 W because the circuit that corrects distortion may be simplified. Therefore, the power consumption of each of the optical module switch devices 100 and 100A is 750 W, which may be half the power consumption of the optical module switch device 100B.

FIG. 16 illustrates another example of the another optical module switch device. Elements that are the same as or similar to those in FIG. 1 are denoted by the same reference signs, and detailed description thereof will be omitted. An optical module switch device 100C illustrated in FIG. 16 includes a circuit board BRD on which a plurality of optical modules OM and a package PKG are mounted. For example, 16 optical modules OM (eight on a front surface and eight on a back surface) are mounted along each side of the rectangular circuit board BRD.

The package PKG includes an organic circuit board, and a plurality of SERDESs and a logic chip LCHIP that performs routing processing that are mounted on the organic circuit board. The logic chip LCHIP is coupled to each of the plurality of serializers/deserializers SERDES. Each SERDES is provided instead of the SERDES_H or the SERDES_L in FIG. 1. 512 SERDESs are mounted on the package PKG, and 128 SERDESs are arranged on each side of the package PKG. One SERDES group indicated by a rectangle in FIG. 16 includes 64 SERDESs.

Each SERDES is coupled to each optical module OM via a 1-bit signal line for transmission and a 1-bit signal line for reception. A transmission rate of an electric signal that each SERDES transmits to or receives from the optical module OM is, for example, 100 Gb/s. Each optical module OM is coupled to 8 SERDESs. Furthermore, a transmission rate of an electric signal transmitted to each bit of a multi-bit signal line coupling the logic chip LCHIP and each SERDES is, for example, 3.125 Gb/s.

Wires used for transmission and reception of 1-bit signals between the SERDES and the logic chip LCHIP are six wires including two differential signal lines for transmission, two differential signal lines for reception, one shield line for transmission, and one shield line for reception. A transmission rate of signals transmitted to the 16 optical modules OM arranged on one side of the circuit board BRD is 12800 Gb/s.

In order to achieve this transmission rate, the number of wires wired from the logic chip LCHIP to the 128 SERDESs arranged on one side of the package PKG is 24576 (six wires for every 4096 signals). Therefore, it is needed to form at least 98304 terminals in the logic chip LCHIP, which makes it difficult to implement the logic chip LCHIP and the package PKG.

From the detailed description above, characteristics and advantages of the embodiments will become apparent. This intends that claims cover the characteristics and advantages of the embodiments described above without departing from the spirit and the scope of the claims. Furthermore, any person having ordinary knowledge in the technical field is to be able to easily come up with various improvements and modifications. Therefore, there is no intention to limit the scope of the inventive embodiments to those described above, and the scope of the inventive embodiments may rely on appropriate improvements and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical module switch device comprising:
a first serial-parallel converter coupled to first signal lines coupled to optical modules, and second signal lines, a number of the second signal lines being greater than a number of the first signal lines, and configured to transmit and receive first signals at a first transmission rate to and from the optical modules by using the first signal lines, respectively;
a second serial-parallel converter coupled to second signal lines coupled to the first serial-parallel converter, and third signal lines, a number of the third lines being greater than a number of the second signal lines, and configured to transmit and receive second signals at a second transmission rate lower than the first transmission rate to and from the first serial-parallel converter by using the second signal lines, respectively; and
a switch circuit coupled to the third signal lines, and configured to transmit and receive third signals at a third transmission rate lower than the second transmission rate to and from the second serial-parallel converter by using the third signal lines, respectively, to perform routing processing based on the received third signals,
wherein the switch circuit is configured to perform routing processing while maintaining synchronization of the signals transmitted between the first and second serial-parallel converters.

2. The optical module switch device according to claim 1, wherein
the first serial-parallel converter includes a first phase locked loop circuit that synchronizes the second signals of multi-bit received from the second serial-parallel converter with a first clock signal used in the first serial-parallel converter, and
the second serial-parallel converter includes a second phase locked loop circuit that synchronizes the second signals of multi-bit received from the first serial-parallel converter with a second clock signal used in the second serial-parallel converter.

3. The optical module switch device according to claim 2, wherein
the second phase locked loop circuit includes
a plurality of variable delay circuits that adjusts, for each bit, amounts of delay of the second signals of multi-bit received from the first serial-parallel converter,
a selection circuit that sequentially selects any one of the bits of the second signals with the amounts of delay adjusted by the plurality of variable delay circuits, and
a delay amount determination circuit that compares phases of a bit selected by the selection circuit and the second clock signal, and determines, based on a result of the comparison, an amount of delay of the variable delay circuit that corresponds to the bit selected by the selection circuit.

4. The optical module switch device according to claim 2, wherein
the first phase locked loop circuit includes
a plurality of variable delay circuits that adjusts, for each bit, amounts of delay of the second signals of multi-bit received from the second serial-parallel converter, and
a delay amount determination circuit that compares phases of each bit of the second signals with the amounts of delay adjusted by the plurality of variable delay circuits and the first clock signal in parallel, and determines, based on a result of the comparison, an amount of delay of each of the plurality of variable delay circuits.

5. The optical module switch device according to claim 2, wherein
the second phase locked loop circuit includes
a plurality of variable delay circuits that adjusts, for each bit, amounts of delay of the second signals of multi-bit received from the first serial-parallel converter, and
a delay amount determination circuit that compares phases of each bit of the second signals with the amounts of delay adjusted by the plurality of variable delay circuits and the second clock signal in parallel, and determines, based on a result of the comparison, an amount of delay of each of the plurality of variable delay circuits.

6. The optical module switch device according to claim 2, wherein
the first phase locked loop circuit includes
a plurality of variable delay circuits that adjusts, for each bit, amounts of delay of the second signals of multi-bit received from the second serial-parallel converter,
a selection circuit that sequentially selects any one of the bits of the second signals with the amounts of delay adjusted by the plurality of variable delay circuits, and
a delay amount determination circuit that compares phases of a bit selected by the selection circuit and the first clock signal, and determines, based on a result of the comparison, an amount of delay of the variable delay circuit that corresponds to the bit selected by the selection circuit.

7. The optical module switch device according to claim 1, further comprising:
a package over which the first serial-parallel converter and a semiconductor chip that includes the second serial-parallel converter and the switch circuit are mounted; and
a circuit board over which the package and the optical modules are mounted,
wherein lengths of the first signal line are shorter than lengths of the second signal line.

8. The optical module switch device according to claim 7, wherein
the first serial-parallel converter is arranged over the package and inside an outer periphery of the package,
the optical modules are arranged over the circuit board and outside the outer periphery of the package, and
the semiconductor chip is arranged in a central portion of the package.

9. The optical module switch device according to claim 1, further comprising:
a package over which the optical modules, the first serial-parallel converter, and a semiconductor chip that includes the second serial-parallel converter and the switch circuit are mounted; and
a circuit board over which the package is mounted,
wherein lengths of the first signal lines are shorter than lengths of the second signal lines.

10. The optical module switch device according to claim 9, wherein
the optical module is arranged over the package and inside an outer periphery of the package,
the first serial-parallel converter is arranged at positions close to the optical modules, and
the semiconductor chip is arranged in a central portion of the package.

* * * * *